US010952237B2

United States Patent
Liu et al.

(10) Patent No.: US 10,952,237 B2
(45) Date of Patent: Mar. 16, 2021

(54) METHOD AND APPARATUS FOR DOWNLINK CONTROL INFORMATION TRANSMISSION

(71) Applicant: NTT DOCOMO, INC., Tokyo (JP)

(72) Inventors: Liu Liu, Beijing (CN); Qin Mu, Beijing (CN); Jing Wang, Beijing (CN); Lihui Wang, Beijing (CN); Huiling Jiang, Beijing (CN); Xiaohong Zhang, Beijing (CN); Yong Li, Beijing (CN)

(73) Assignee: NTT DoCoMo, Inc., Tokyo (JP)

(*) Notice: Subject to any disclaimer, the term of this patent is extended or adjusted under 35 U.S.C. 154(b) by 0 days.

(21) Appl. No.: 16/495,382

(22) PCT Filed: Mar. 7, 2018

(86) PCT No.: PCT/CN2018/078229
§ 371 (c)(1),
(2) Date: Sep. 18, 2019

(87) PCT Pub. No.: WO2018/171424
PCT Pub. Date: Sep. 27, 2018

(65) Prior Publication Data
US 2020/0022177 A1  Jan. 16, 2020

(30) Foreign Application Priority Data
Mar. 21, 2017 (CN) .......................... 201710168922.7

(51) Int. Cl.
*H04W 4/00* (2018.01)
*H04W 72/12* (2009.01)
*H04L 1/00* (2006.01)

(52) U.S. Cl.
CPC ....... *H04W 72/1289* (2013.01); *H04L 1/0008* (2013.01); *H04L 1/0038* (2013.01)

(58) Field of Classification Search
CPC . H04W 72/1289; H04L 1/0008; H04L 1/0038
See application file for complete search history.

(56) References Cited

U.S. PATENT DOCUMENTS 9,172,504 B2   10/2015 Wu
2012/0201216 A1   8/2012 Wu
(Continued)

FOREIGN PATENT DOCUMENTS

CN    101478808 A    7/2009
CN    102056198 A    5/2011
(Continued)

OTHER PUBLICATIONS

International Search Report (in English and Chinese) issued in PCT/CN2018/078229, dated May 30, 2018; ISA/CN.

*Primary Examiner* — Elisabeth Benoit Magloire
(74) *Attorney, Agent, or Firm* — Harness, Dickey & Pierce, P.L.C.

(57) ABSTRACT

The present disclosure provides a downlink control information transmission method, including generating more than one downlink control information (DCI) according to scheduling information of a user equipment (UE); determining a detection order of the more than one DCI and positions of the more than one DCI in a searching space; adding a position indication field to a respective DCI according to the detection order of the more than one DCI and the positions of the more than one DCI in the searching space; wherein, the position indication field is used to indicate a position of a next DCI of the respective DCI in the detection order; in which, a position indication field in a last DCI in the detection order is used to indicate a position of a first DCI in the detection order; and transmitting the more than one DCI in the searching space according to the positions of the more than one DCI in the searching space. The present (Continued)

disclosure also provides a UE-side method, a corresponding base station and a UE.

18 Claims, 13 Drawing Sheets

(56) References Cited

U.S. PATENT DOCUMENTS

| | | | | |
|---|---|---|---|---|
| 2013/0205176 A1* | 8/2013 | Qian | ............ | H04L 1/20 |
| | | | | 714/704 |
| 2014/0029561 A1* | 1/2014 | Kim | ............ | H04L 5/0053 |
| | | | | 370/329 |
| 2014/0211751 A1* | 7/2014 | Zhang | ............ | H04L 5/0035 |
| | | | | 370/330 |
| 2015/0092637 A1* | 4/2015 | Yang | ............ | H04L 5/16 |
| | | | | 370/296 |
| 2016/0254878 A1* | 9/2016 | Wang | ............ | H04W 72/042 |
| | | | | 370/329 |
| 2017/0079059 A1 | 3/2017 | Li et al. | | |
| 2017/0164407 A1* | 6/2017 | Yang | ............ | H04W 48/16 |
| 2017/0230994 A1* | 8/2017 | You | ............ | H04L 5/0053 |
| 2017/0230995 A1* | 8/2017 | Kim | ............ | H04W 52/04 |
| 2017/0290046 A1* | 10/2017 | Sun | ............ | H04W 72/082 |
| 2017/0318565 A1* | 11/2017 | Golitschek Edler Von | | |
| | | Elbwart | ............ | H04W 72/042 |
| 2019/0097779 A1* | 3/2019 | Wu | ............ | H04L 1/1858 |
| 2019/0191424 A1* | 6/2019 | Wang | ............ | H04W 92/18 |
| 2019/0387501 A1* | 12/2019 | Park | ............ | H04W 72/1289 |

FOREIGN PATENT DOCUMENTS

| | | |
|---|---|---|
| CN | 103039104 A | 4/2013 |
| CN | 103188799 A | 7/2013 |

* cited by examiner

METHOD AND APPARATUS FOR DOWNLINK CONTROL INFORMATION TRANSMISSION

CROSS REFERENCE TO RELATED APPLICATIONS

This application is a 371 National Stage of International Application No. PCT/CN2018/078229, filed on Mar. 7, 2018, which claims priority to Chinese Patent Application No. 201710168922.7, entitled "Method and Apparatus for downlink control information transmission" and filed with the Chinese Patent Office on Mar. 21, 2017, the entire disclosures of the above applications are incorporated herein by reference.

FIELD OF THE INVENTION

The present disclosure relates to the technical field of mobile communication, and in particular to a method and apparatus for downlink control information transmission (DCI).

BACKGROUND OF THE INVENTION

With the development of mobile communication technology, the era of the 5th generation mobile communication technology (5G) has come into being. From the past to the present 4G LTE (Long Term Evolution) networks, mobile networks primarily serve mobile terminals, such as cell phones. In the era of 5G, however, mobile networks need to serve devices of various types and requirements, such as the mobile broadband, massive Internet of Things (IoT), mission-critical IoT, and the like. These types of services have different requirements in terms of mobility, billing, security, policy control, latency, reliability, and the like, which essentially requires people to build a dedicated network for each type of service. To meet the requirement, the network slice (NS) technology is proposed. Through the network slice technology, a plurality of logical networks may be divided from an independent physical network, and different logical networks may have different characteristics of mobility, reliability, time delay, and the like, so as to meet the requirements of different services. However, in order to implement user scheduling and control separately on different network slices, a DCI needs to be sent separately for each network slice. Further, if a user equipment (UE) registers a plurality of services on different network slices, the UE needs to detect a plurality of DCIs of the network slices respectively, so as to obtain scheduling information of its plurality of services. Therefore, compared with an LTE system, the method for a UE to blindly detect DCIs carried on physical downlink control channels (PDCCHs) corresponding to the different network slices becomes particularly complicated.

SUMMARY OF THE INVENTION

Embodiments of the present disclosure provide a downlink control information transmission method. The method includes: generating more than one downlink control information (DCI) according to scheduling information of a user equipment (UE); determining a detection order of the more than one DCI and positions of the more than one DCI in a searching space; adding a position indication field to a respective DCI according to the detection order of the more than one DCI and the positions of the more than one DCI in the searching space; in which, the position indication field is used to indicate a position of a next DCI of the respective DCI in the detection order; in which, a position indication field of a last DCI in the detection order is used to indicate a position of a first DCI in the detection order; and transmitting the more than one DCI in the searching space according to the positions of the more than one DCI in the searching space.

Accordingly, the embodiments of the present disclosure further provide a downlink control information detecting method. The method includes:

Step A, performing downlink control information (DCI) detection in a searching space, and proceeding to step B after detecting a DCI;

Step B, determining a position of a next DCI according to a position indication field of the currently detected DCI, in which a respective DCI includes a position indication field to indicate a position of a next DCI of the respective DCI; and Step C, performing DCI detection at the position of the next DCI, and returning to Step B, until all DCIs are detected.

The embodiments of the present disclosure further provide another downlink control information transmission method. The method includes: generating more than one downlink control information (DCI) according to scheduling information of a UE, wherein a respective DCI comprises a slice indication field (SIF) to indicate a network slice corresponding to the respective DCI; performing bit padding for the generated more than one DCI according to a preset DCI length, to obtain more than one DCI with a same length; and transmitting the more than one DCI with the same length in a shared searching space.

Accordingly, the embodiments of the present disclosure further provide downlink control information (DCI) detecting method. The method includes: performing DCI detection in a shared searching space according to a preset DCI length; and determining a network slice corresponding to a detected DCI according to a slice indication field (SIF) in the detected DCI.

The embodiments of the present disclosure provide a base station, including:

a processor;

a memory in connection with the processor; in which the memory stores machine-readable instruction modules executable by the processor; the machine-readable instruction modules include:

a generation module to generate more than one downlink control information (DCI) according to scheduling information of a user equipment (UE);

a detection order determination module to determine a detection order of the more than one DCI;

a position determination module to determine positions of the more than one DCI in a searching space;

a position field adding module to add a position indication field to a respective DCI according to the detection order of the more than one DCI and the positions of the more than one DCI in the searching spaces; in which the position indication field is used to indicate a position of a next DCI of the respective DCI in the detection order; in which a position indication field of a last DCI in the detection order is used to indicate a position of a first DCI in the detection order; and a transmission module to transmit the more than one DCI in the searching space according to the positions of the more than one DCI in the searching space.

The embodiments of the present disclosure further provide a user equipment (UE), including:

a processor;

a memory in connection with the processor; wherein the memory stores machine-readable instruction modules executable by the processor; the machine-readable instruction modules comprise:

a detecting module to perform downlink control information (DCI) detection in a searching space, and trigger an analysis module to operate after the detecting module detects a DCI;

the analysis module to determine a position of a next DCI according to a position indication field of the currently detected DCI, in which a respective DCI includes a position indication field to indicate a position of a next DCI of the respective DCI; and a detecting module to perform DCI detection at the position of the next DCI, and trigger the analysis module to operate after the detecting module detects the next DCI.

The embodiments of the present disclosure further provide a base station, including:

a processor;

a memory in connection with the processor; in which the memory stores machine-readable instruction modules executable by the processor; the machine-readable instruction modules include:

a generation module to generate more than one downlink control information (DCI) according to scheduling information of a UE, in which a respective DCI includes a slice indication field (SIF) to indicate a network slice corresponding to the respective DCI;

a padding module to perform bit padding for the generated more than one DCI according to a preset DCI length, to obtain more than one DCI with a same length; and a transmission module to transmit the more than one DCI with the same length in a shared searching space.

The embodiments of the present disclosure provide a user equipment (UE), including:

a processor;

a memory in connection with the processor; wherein the memory stores machine-readable instruction modules executable by the processor; the machine-readable instruction modules comprise:

a detecting module to perform DCI detection in a shared searching space according to a preset DCI length; and a correspondence determination module to determine a network slice corresponding to a detected DCI according to a slice indication field (SIF) in the detected DCI.

The embodiments of the present disclosure additionally provide a non-transitory computer-readable storage medium, storing machine-readable instructions executable by a processor to perform any of the method in the above.

It can be seen that, through performing bit padding for the DCIs or adding an indication for the position of a next DCI in the DCIs, can greatly simplify the complexity of DCI blind detection, greatly reduce the time delay of DCI blind detection performed by the UE, so as to reduce the power consumption of the UE, and save the hardware and network resources.

BRIEF DESCRIPTION OF DRAWINGS

In order to more clearly illustrate the embodiments of the present disclosure or the technical solutions in the prior art, the drawings used in the description of the embodiments or the prior art will be briefly described below. Obviously, the drawings described hereinafter are only some embodiments of the present disclosure, and a person skilled in the art would obtain other drawings from the drawings herein without involving any inventive effort.

DETAILED DESCRIPTION OF EMBODIMENTS

Figure 1:
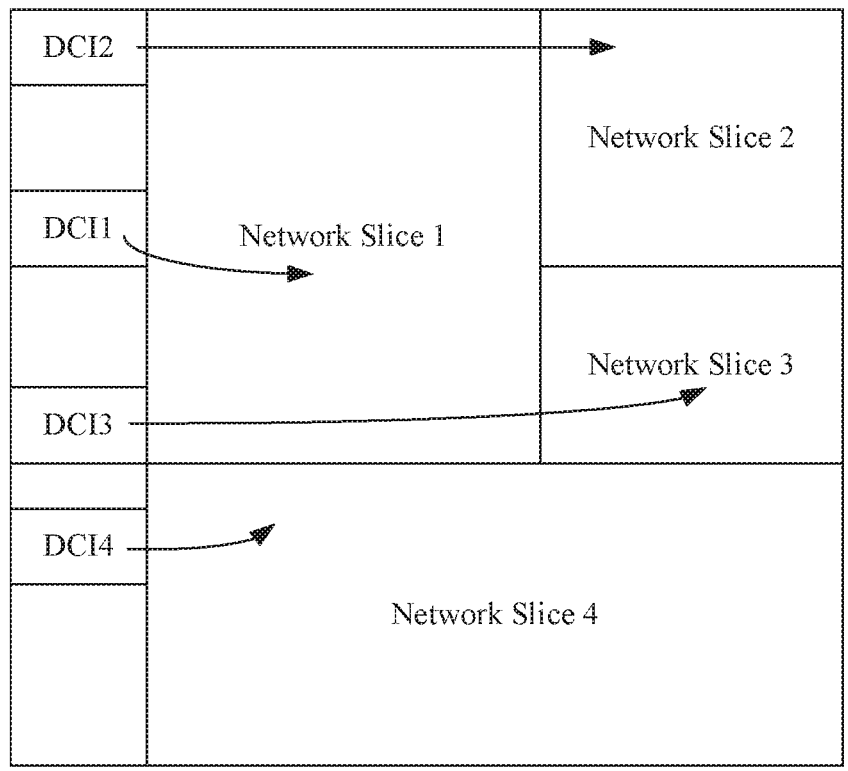
FIG. 1 shows an example of a shared searching space (SS) according to an embodiment of the present disclosure.

A clear and complete description of the technical scheme in the embodiments of the present disclosure will be made below with reference to the accompanying drawings. Apparently, the described embodiments are merely a part of the embodiments, but not all the embodiments of the present disclosure. Based on the embodiments in the present disclosure, all other embodiments obtained by those of ordinary skill in the art without involving any inventive efforts are falling within the scope of protection of the present disclosure.

For the conciseness and clarity of description purpose, the aspects of the present disclosure will be described below with several representative embodiments. Numerous details in the embodiments are provided only to aid in understanding the aspects of the present disclosure. It is apparent, however, that the implementation of the present disclosure may not be limited to these details. In order to avoid unnecessarily obscuring the aspects of the present disclosure, some embodiments are not described in detail, but rather are presented only as a framework. Hereinafter, "comprising" refers to "including but not limited to", "according to . . . " refers to "at least according to . . . , but not limited to only according to . . . " Hereinafter, where the amount of a component is not specifically indicated, it is meant that the component may be one or more, or may be understood to be at least one.

As described in the above, a plurality of logical networks may be divided from an independent physical network through the network slice technology, so as to meet the requirements of different services. However, since DCIs of logical networks corresponding to different network slices are separately transmitted, the method for a UE to blindly detect DCIs carried on PDCCHs corresponding to the different network slices becomes particularly complicated.

In order to reduce the complexity of DCI blind detection performed by the UE in the network slice environment, some embodiments of the present disclosure provide various methods for DCI transmission, which can reduce the complexity and time delay of the DCI blind detection performed by the UE, and improve the blind detection efficiency and power consumption of the UE.

As will be appreciated by those skilled in the art that, in an LTE system, a base station will transmit DCIs of respective UEs in a determined time-domain/frequency-domain resource region. The determined time-domain/frequency-domain resource region is commonly referred to as a searching space (SS). That is, the UEs perform DCI blind detection on the searching space. In the network environment of 5G network slice, there are different schemes for configuring a searching space. For example, different DCIs may share a same searching space, which is called a shared SS mode for short; or different DCIs may occupy different searching spaces respectively, which is called an exclusive SS mode for short. For the shared SS mode, the UEs will perform blind detection for DCIs corresponding to respective network slices in the shared searching space. For the exclusive SS mode, each network slice generally has a respective searching space, and the base station sends a DCI corresponding to a certain network slice on a searching space of the certain network slice. Therefore, the UEs need to perform blind detection for DCIs corresponding to respective network slices on searching spaces corresponding to the respective network slices.

FIG. 1 shows an example of a shared SS. As can be seen from FIG. 1, DCI1 corresponding to network slice 1, DCI2 corresponding to network slice 2, DCI3 corresponding to network slice 3 and DCI4 corresponding to network slice 4 are in a same searching space. In the shared SS mode as shown in FIG. 1, a base station transmits DCIs through a shared searching space. Since a plurality of DCIs of a UE share the same searching space, the plurality of DCIs will cause severe PDCCH congestion when they are sent through the same searching space. In this case, the searching space needs to be enlarged so as to avoid PDCCH congestion. However, as the searching space enlarges, the number of searches needed by the UE for performing blind detection increases, resulting in an excessively high complexity of blind detection.

For the exclusive SS mode, since each DCI of a network slice will exclusively occupy a separate searching space, the UE needs to search for the DCI of each network slice separately in the searching space corresponding to each network slice. Therefore, the size of searching spaces on which the UE performs blind detection and the complexity of blind detection performed by the UE will be proportional to the number of network slices. With a large number of network slices, the complexity of blind detection performed by the UE will be very high.

In order to solve the above issues, the present disclosure proposes a plurality of DCI transmission methods. Hereinafter, the DCI transmission methods proposed by the present disclosure will be described in detail through various examples.

EXAMPLE 1

Applied to the Shared SS Mode

As is known in LTE that, for different DCI formats, the load sizes thereof may be different. That is to say, DCIs in different DCI formats may have different lengths. Thus, when a UE performs DCI blind detection in a searching space, the UE must perform one blind detection according to each DCI load size respectively in the searching space. That is, the number of times of the UE performing blind detection is exponentially increased as the DCI load size varies.

Therefore, in this example, DCIs in all the DCI formats may be configured with a same load size, i.e., configuring DCIs in all the DCI formats to have a same length. Generally, the length of a DCI is determined according to the functionality it needs to support. For example, in an LTE system, the range of DCI lengths may typically be set to 35~57 bits. Specifically, in some embodiments of the present disclosure, DCIs in different DCI formats may be padded into DCIs of a same length by bit padding. Thus, in the application scenario of 5G network slices as described above, although the searching spaces must be enlarged in order to reduce PDCCH congestion, since all DCIs have the same length, the UE may perform blind detection only for one DCI load length in the searching spaces, without performing blind detection for other DCI load lengths, thereby greatly reducing the complexity of blind detection.

Further, in some embodiments of the present disclosure, with the shared SS mode employed, each DCI may include a slice indication field (SIF) to indicate which network slice the DCI corresponds to. Thus, after blindly detecting a DCI, the UE can directly determine a network slice corresponding to the DCI according to an SIF of the DCI.

Figure 2:
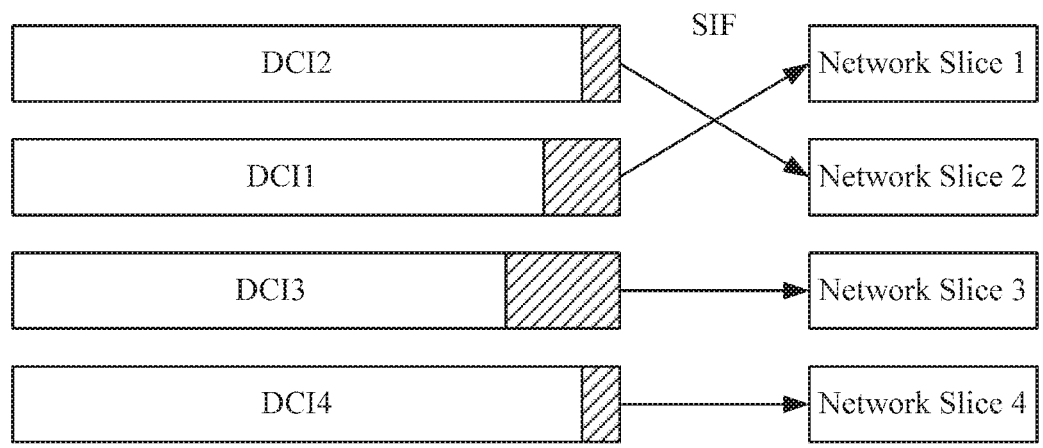
FIG. 2 shows an example of DCIs according to an embodiment of the present disclosure.

FIG. 2 shows an example of DCIs according to an embodiment of the present disclosure. As shown in FIG. 2, each DCI has the same load length. Further, each DCI includes, in addition to control information, padding bits of a certain length (as shown in FIG. 2 by the shaded portions), to pad the DCIs of different load lengths into the same length. Further, each DCI may include an SIF field to indicate a network slice to which the DCI corresponds. The length of the SIF field may be related to the number of network slices. For example, if there are four network slices, then the SIF field may have a length of 2 bits, where "00" represents network slice 4, "01" represents network slice 1, "10" represents network slice 2, and "11" represents network slice 3. Of course, it is also possible to indicate the network slices corresponding to the DCIs in other ways, the present disclosure is not limited thereto.

Further, in some embodiments of the present disclosure, each DCI may further include a number indication field (NIF) to indicate the total number of DCIs in a searching space currently shared. The searching space currently shared is also referred to as a shared searching space. Thus, in the process of blind detection performed by the UE, the UE may further determine whether it has completed the blind detection of all DCIs according to an NIF field of a detected DCI. The blind detection may be directly stopped after the number of the detected DCIs reaches a number indicated by the NIF field, so as to further reduce the complexity of blind detection.

Hereinafter, the method for DCI transmission in the example will be described in detail with reference to the accompanying drawings.

Figure 3A:
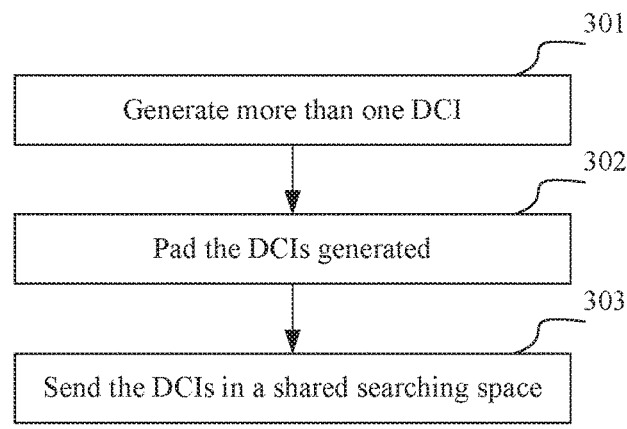
FIG. 3a shows a flow chart outlining a method for DCI transmission at a base station side according to an embodiment of the present disclosure.

FIG. 3*a* shows a flow chart outlining a method for DCI transmission at a base station side according to an embodiment of the present disclosure. As shown in FIG. 3*a*, the method may include:

Step 301: the base station generates more than one DCI according to scheduling information of a UE, where each DCI includes an SIF field to indicate a network slice corresponding to the DCI.

In some embodiments of the present disclosure, the DCIs generated by the base station may further include a NIF field to indicate the number of DCIs sent for the UE on a shared searching space.

Step 302: the base station performs bit padding for the generated more than one DCI according to a preset DCI length, to obtain more than one DCI with a same length.

Step 303: the base station sends the more than one DCI of the same length in a determined shared searching space.

Figure 3B:
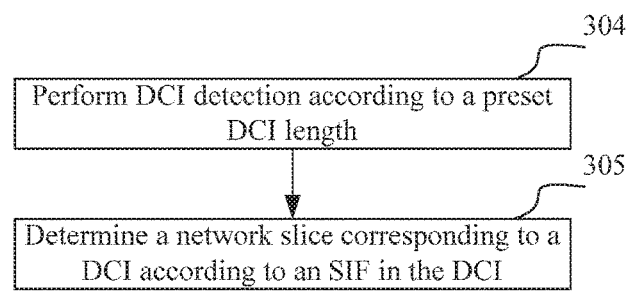
FIG. 3b shows a flow chart outlining a method for DCI transmission at a UE side according to an embodiment of the present disclosure.

FIG. 3*b* shows a flow chart outlining a method for DCI transmission at a UE side, which is also referred to as a DCI detecting method at the UE side, according to an embodiment of the present disclosure. As shown in FIG. 3*b*, the method may include:

Step 304: the UE performs DCI detection in the determined shared searching space according to a preset DCI length.

Step 305: the UE determines a network slice corresponding to a detected DCI according to an SIF field in the detected DCI.

If the DCI detected by the UE also includes an NIF field, then the UE determines the number of DCIs sent by the base station for it in the current shared searching space, according to the NIF field, and stops the DCI detection in the shared searching space when the number of DCIs it has detected reaches a number indicated by the NIF field.

As can be seen from the above methods, through padding the DCIs of different lengths into the DCIs of the same length by bit padding, the UE may perform blind detection only for one DCI length in the searching space, without performing blind detection for each DCI length, thereby greatly reducing the complexity of blind detection performed by the UE, and further reducing the power consumption and the time delay of DCI blind detection of the UE.

EXAMPLE 2

Applied to the Shared SS Mode

Also to reduce the complexity of blind detection performed by the UE, in some embodiments of the present disclosure, a link relationship may be established between DCIs transmitted in a shared searching space. The link relationship means that each DCI may indicate a position of another DCI; and a position of each DCI may be indicated by another DCI. For example, all DCIs within the shared searching space may be sorted in any or specific or specified order. The order may be understood as a detection order of the DCIs. After the sorting, each DCI may be set to indicate a position of the next DCI in the detection order, and the last DCI in the detection order indicates the position of the first DCI in the detection order. Specifically, a position indication field (PIF) may be added to each DCI to indicate the position information of the next DCI in the shared searching space. In some embodiments, the position indication field may indicate the position information of the next DCI in the shared searching space, by means of, for example a predefined bitmap or mapping relationship. In this way, when detecting one of the DCIs, the UE may determine the position of the next DCI according to a PIF field in the DCI. Thus, after only blindly detecting one DCI, the UE can sequentially find the remaining DCIs through the link relationship between the DCIs, without performing blind detection for all the DCIs one by one in the shared searching space.

Figure 4:
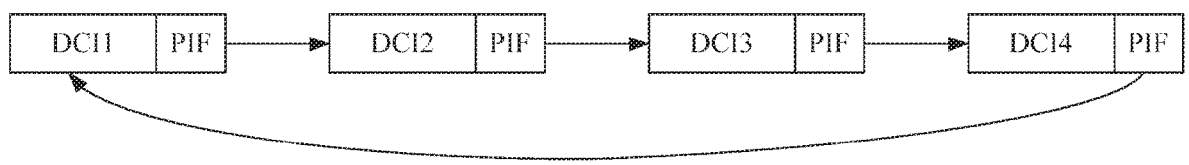
FIG. 4 shows an example of a link relationship between DCIs according to an embodiment of the present disclosure.

FIG. 4 shows an example of a link relationship between DCIs according to an embodiment of the present disclosure. As shown in FIG. 4, each DCI contains a position indication field, PIF, to indicate the position of the next DCI. Among them, the PIF of DCI1 indicates the position of DCI2; the PIF of DCI2 indicates the position of DCI3; the PIF of DCI3 indicates the position of DCI4; and the PIF of DCI4 indicates the position of DCI1. In this way, no matter which DCI is first found in the shared searching space by the UE through blind detection, all remaining DCIs can be found through the link relationship.

Further, in some embodiments of the present disclosure, each DCI may further include a DCI number indication field, NIF, to indicate the total number of DCIs transmitted by the base station for the UE in the currently shared searching space. In this way, in the process of blind detection performed by the UE, if the UE fails to detect a certain DCI, the UE may further determine whether it has completed the blind detection of all DCIs, according to the NIF field of a detected DCI. The blind detection may be directly stopped after the number of detected DCIs reaches a number indicated by the NIF field, so as to further reduce the complexity of the blind detection.

Hereinafter, the method for DCI transmission in the example will be described in detail with reference to the accompanying drawings.

Figure 5A:
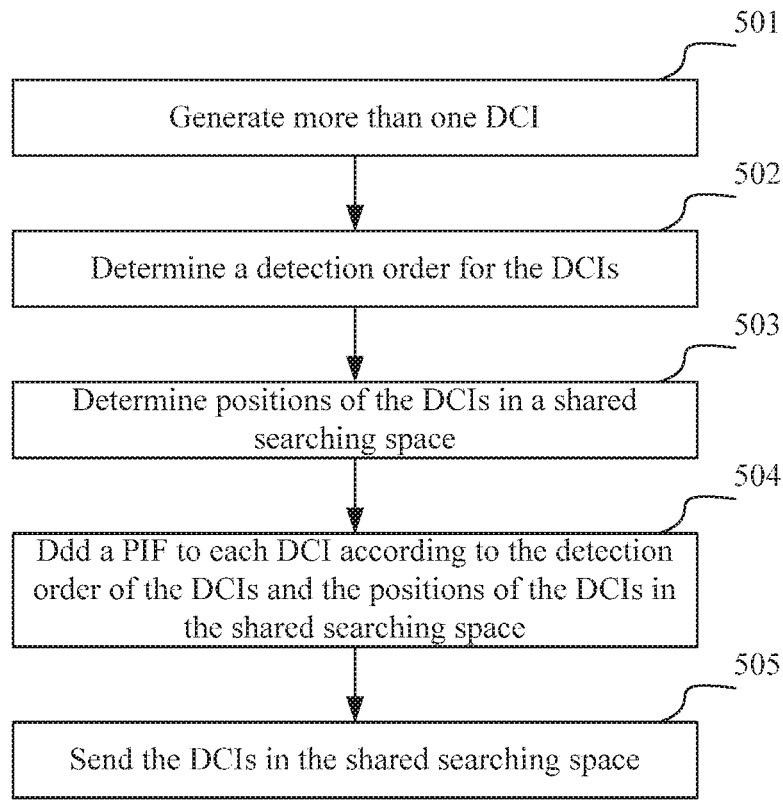
FIG. 5a shows a flow chart outlining a method for DCI transmission at a base station side according to an embodiment of the present disclosure.

FIG. 5*a* shows a flow chart outlining a method for DCI transmission at a base station side according to an embodiment of the present disclosure. As shown in FIG. 5*a*, the method may include:

Step 501: the base station generates more than one DCI according to scheduling information of a UE, where each DCI includes an SIF field to indicate a network slice corresponding to the DCI.

In some embodiments of the present disclosure, the DCIs generated by the base station may further include an NIF field to indicate the number of DCIs transmitted by the base station for the UE in a shared searching space.

Step 502: the base station determines a detection order for the more than one DCI.

In some embodiments, the base station may determine the detection order for the more than one DCI by a sorting method. The sorting may use any sorting method, such as a random sorting method. In some embodiments, the base station may also directly specify a DCI order as the detection order of the DCIs. The base station may also configure the determined detection order of the DCIs for the UE through control signaling.

Step 503: the base station determines positions of the more than one DCI in a shared searching space.

Step 504: the base station adds a position indication field, PIF, to each DCI, according to the determined detection order of the DCIs and the positions of the more than one DCI in the shared searching space, to indicate the position of a next DCI in the detection order; where, the last DCI in the detection order will indicate the position of the first DCI in the detection order.

Step 505: the base station sends the more than one DCI in the shared searching space.

Figure 5B:
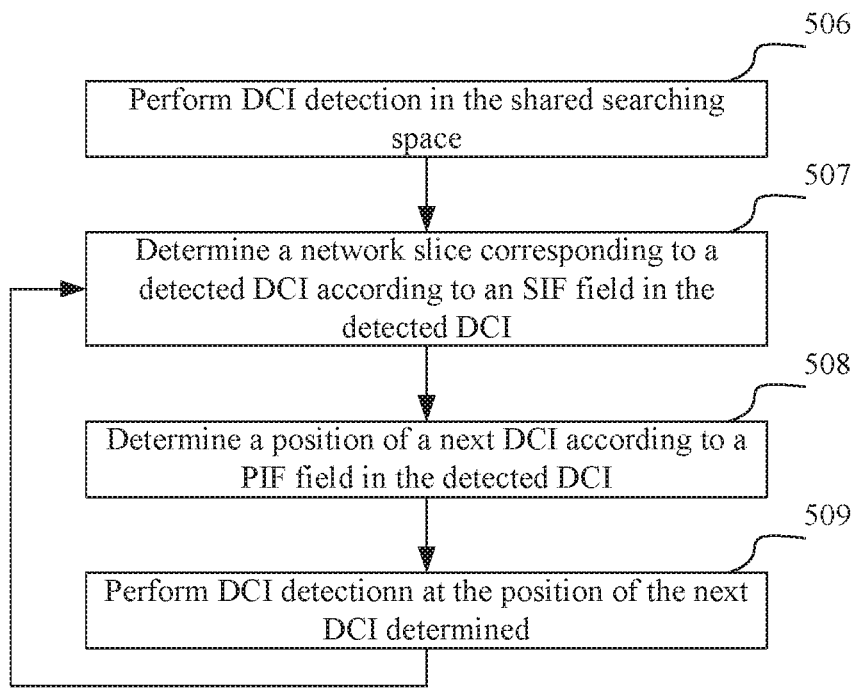
FIG. 5b shows a flow chart outlining a method for DCI transmission at a UE side according to an embodiment of the present disclosure.

FIG. 5b shows a flow chart outlining a method for DCI transmission at a UE side, which may also be referred to as a UE-side DCI detecting method, according to an embodiment of the present disclosure. As shown in FIG. 5b, the method may include:

Step 506: the UE performs DCI detection in the shared searching space, and proceeds to Step 507 after detecting one DCI.

Step 507: the UE determines a network slice corresponding to a detected DCI according to an SIF field in the detected DCI.

Step 508: the UE determines a position of a next DCI according to a PIF field in the detected DCI.

Step 509: the UE performs DCI detection at the position of the next DCI determined, and returns to Step 507 after detecting a DCI, until all DCIs are detected.

If no DCI is detected by the UE at the position of the next DCI determined, the UE may return to Step 506 to continue the blind detection, or may begin blind detection for a next DCI according to a DCI detection order configured by the base station.

If the DCI detected by the UE also includes an NIF field, then the UE determines the number of DCIs sent by the base station for it in the current shared searching space, according to the NIF field, and stops the DCI detection in the shared searching space when the number of DCIs it has detected reaches a number indicated by the NIF field.

As can be seen from the above methods, by establishing the link relationship between the DCIs, through one DCI, the position of the next DCI can be directly determined. That is, after one DCI is found, the positions of all the other DCIs can be sequentially determined, without performing blind detection for all the DCIs one by one, thereby greatly reducing the complexity of blind detection, and reducing the power consumption and the time delay of DCI blind detection of the UE.

EXAMPLE 3

Applied to the Exclusive SS Mode

Similarly to the method in Example 2, in order to reduce the complexity of blind detection performed by the UE, in some embodiments of the present disclosure, a link relationship may be established between DCIs transmitted separately in searching spaces of respective network slices. The link relationship means that each DCI in the searching spaces of the respective network slices may indicate the position of another DCI; also the position of each DCI may be indicated by another DCI. For example, all DCIs in the searching spaces of the respective network slices may be sorted in any order, to obtain a detection order of the DCIs. Each DCI is set to indicate a position of a next DCI in the detection order, and the last DCI in the detection order will indicate the position of the first DCI in the detection order. Specifically, a position indication field (PIF) may be added to each DCI to indicate the position information of the next DCI in the searching spaces. In some embodiments, the position indication field may indicate the position information of a next DCI in the searching spaces by means of, for example, a predefined bitmap or mapping relationship. In this way, after detecting a DCI on a searching space of a network slice, the UE may determine the position of the next DCI according to a PIF field in the DCI. Thus, after only blindly detecting one DCI, the UE can find the remaining DCIs through the link relationship between the DCIs, without performing blind detection for all the DCIs one by one.

An example of the link relationship between the DCIs as described in the embodiments of the present disclosure may also refer to FIG. 4. As shown in FIG. 4, DCIs in searching spaces of different network slices all contain a position indication field, PIF, to indicate the position of a next DCI. Among them, the PIF of DCI1 indicates the position of DCI2; the PIF of DCI2 indicates the position of DCI3; the PIF of DCI3 indicates the position of DCI4; and the PIF of DCI4 indicates the position of DCI1. In this way, no matter a DCI of which network slice is found by the UE through blind detection, all remaining DCIs can be found through the link relationship.

Hereinafter, the method for DCI transmission in the example will be described in detail with reference to the accompanying drawings.

Figure 6A:
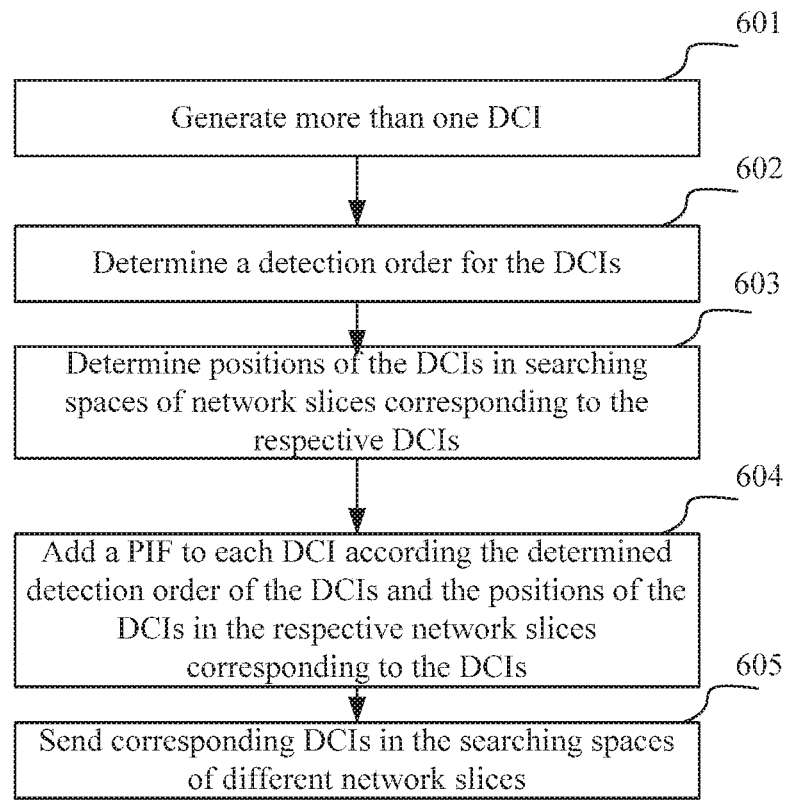
FIG. 6a shows a flow chart outlining a method for DCI transmission at a base station side according to an embodiment of the present disclosure.

FIG. 6a shows a flow chart outlining a method for DCI transmission at a base station side according to an embodiment of the present disclosure. As shown in FIG. 6a, the method may include:

Step 601: the base station generates more than one DCI according to scheduling information of a UE.

Step 602: the base station determines a detection order for the more than one DCI.

In some embodiments as previously described, the base station may determine the detection order for the DCIs by sorting the DCIs or specifying a DCI order, etc.

Step 603: the base station determines positions of the more than one DCI in searching spaces of network slices corresponding to the respective more than one DCI.

Step 604: the base station adds a position indication field, PIF, to each DCI according to the determined detection order of the more than one DCI and the positions of the more than one DCI in the searching spaces of the network slices corresponding to the respective more than one DCI, to indicate the position of a next DCI of each DCI in the detection order, where the last DCI in the detection order will indicate the position of the first DCI in the detection order.

Step 605: the base station respectively sends the more than one DCI in the searching spaces of the different network slices.

Figure 6B:
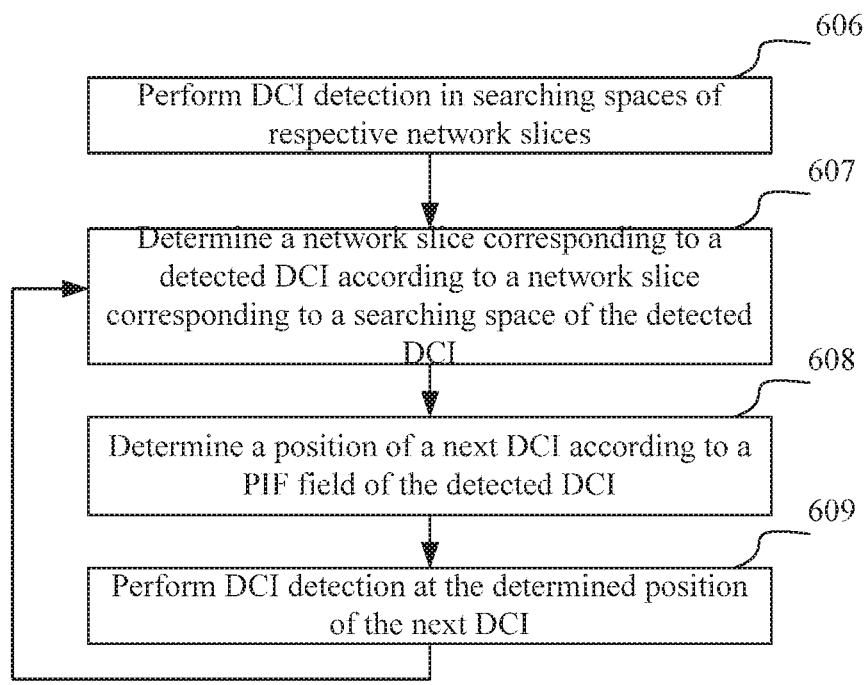
FIG. 6b shows a flow chart outlining a method for DCI transmission at a UE side according to an embodiment of the present disclosure.

FIG. 6b shows a flow chart outlining a method for DCI transmission at a UE side, which may also be referred to as a UE-side DCI detecting method, according to an embodiment of the present disclosure. As shown in FIG. 6b, the method may include:

Step 606: the UE performs DCI detection in searching spaces of respective network slices, until one DCI is detected.

Step 607: the UE determines a network slice corresponding to a detected DCI according to a network slice corresponding to a searching space of the detected DCI.

Since in the exclusive SS mode, the searching spaces and the network slices are corresponding to each other, and if the UE is scheduled on a certain network slice, the base station will transmit a DCI of the network slice on a searching space corresponding to the network slice. Therefore, in some embodiments of the present disclosure, a network slice corresponding to a DCI may be determined according to a searching space in which the DCI is located, without adding a slice indication field, SIF, to the DCI.

Step 608: the UE determines a position of a next DCI according to a PIF field of the detected DCI.

Step 609: the UE performs DCI detection at the determined position of the next DCI, and returns to Step 607 after detecting a DCI, until all DCIs are detected.

If no DCI is detected at the position of the next DCI determined, the UE may return to Step 606 to continue the blind detection until a next DCI is found; or the UE may perform blind detection for the next DCI in a searching space corresponding to the next DCI according to a DCI detection order configured by the base station.

Similar to example 2, by establishing the link relationship between the DCIs, through one DCI, the position of the next DCI can be directly determined. That is, after one DCI is found, the positions of all the other DCIs can be sequentially determined, without performing blind detection for all the DCIs one by one, thereby greatly reducing the complexity of blind detection, and reducing the power consumption and the time delay of DCI blind detection of the UE.

EXAMPLE 4

Applied to the Exclusive SS Mode

Same with Example 3, in this example, a link relationship may be established between DCIs transmitted separately in searching spaces of respective network slices. In this way, after detecting a DCI on a searching space, the UE may determine the position of a next DCI according to a PIF field in the DCI. Thus, after only blindly detecting one DCI, the UE can find the remaining DCIs through the link relationship between the DCIs, without performing blind detection for all the DCIs one by one.

In addition, in order to further reduce the complexity of blind detection performed by the UE, a searching space may be pre-selected from the searching spaces of the respective network slices, and set as a priority searching space, and the UE may be specified to perform DCI blind detection first in the priority searching space. Note that the searching space selected may be a system default priority searching space configured by an operator or may be a searching space randomly selected by the base station. Further, specifying the UE to perform the DCI blind detection first in the priority searching space may be configured by higher-layer signaling.

Meanwhile, the base station needs to ensure to send a DCI in the priority searching space. In this way, it is ensured that when the UE performs blind detection in the first searching space, the UE can find a DCI, and that the UE can find other DCIs through the link relationship between the DCIs, thereby shortening the time for blindly detecting a first DCI for the first time, and further reducing the complexity of DCI blind detection, the power consumption of the UE and the like. However, there may be an issue that if the UE is not scheduled on a network slice corresponding to the priority searching space, originally no DCI will be transmitted for the UE in the priority searching space, i.e., the DCI transmitted for the UE in the priority searching space is void. In this case, if the base station sends a DCI corresponding to another network slice in the priority searching space, it may cause that a network slice corresponding to the searching space where the DCI is detected is inconsistent with that corresponds to the DCI. In order to solve this issue, in some embodiments of the present disclosure, the base station needs to add a slice indication field to a DCI sent by the base station in the priority searching space to indicate a network slice corresponding to the DCI.

Figure 7:
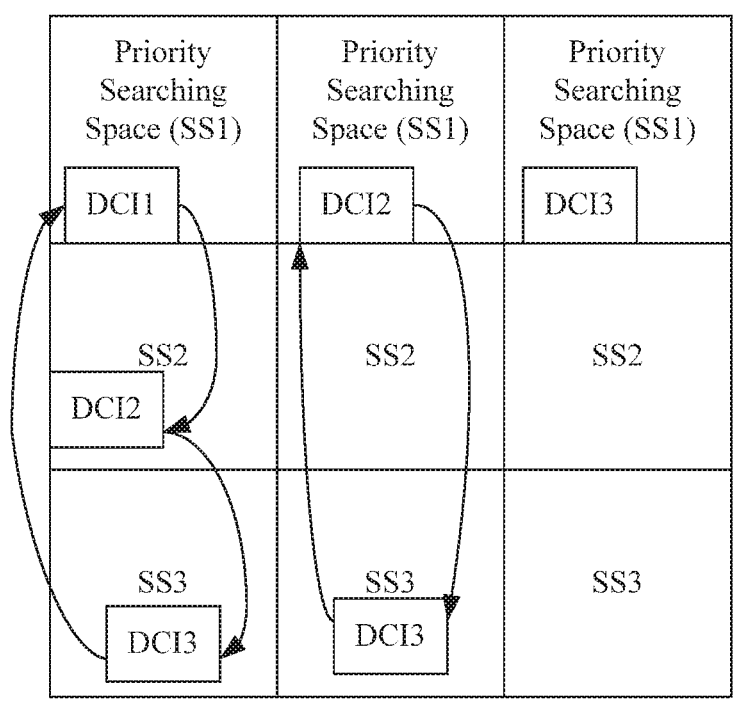
FIG. 7 shows an example of a link relationship between DCIs according to an embodiment of the present disclosure.

An example of a link relationship between the DCIs as described in the example may refer to FIG. 7. As shown in FIG. 7, there are searching spaces of a plurality of network slices in each transmission time interval (TTI1, TTI2, TTI3), in which searching space 1 (SS1) is a priority searching space. Since the UE is scheduled by network slice 1 in the first TTI, DCI1 is placed in SS1. In this case, DCI1 will indicate that its corresponding network slice is SS1 and indicate a position of a next DCI (DCI2). Thus, in the first TTI, the UE will find DCI1 in the priority searching space (SS1) and further find DCI2 and DCI3 in turn according to the link relationship between the DCIs. In the second TTI, where the network slice 1 does not schedule the UE, the base station chooses to place DCI2 into SS1 (the searching space SS2 of the network slice 2 is therefore void). In this case, DCI2 will indicate that its corresponding network slice is SS2 and indicate a position of a next DCI (DCI3). Thus, in the second TTI, the UE will find DCI2 in the priority searching space (SS1), and the UE first determines that a network slice corresponding to the DCI is SS2 according to an SIF field in DCI2, and further finds DCI3 according to the link relationship between the DCIs. In the third TTI, where network slice 1 does not schedule the UE, the base station chooses to place DCI3 into SS1 (the searching space SS3 of the network slice 3 is therefore void). In this case, DCI3 will indicate that its corresponding network slice is SS3. Thus, in the third TTI, the UE will find DCI3 in the priority searching space (SS1) and the UE determines that a network slice corresponding to the DCI is SS3 according to an SIF field in DCI3.

Hereinafter, the method for DCI transmission in the example will be described in detail with reference to the accompanying drawings.

Figure 8A:
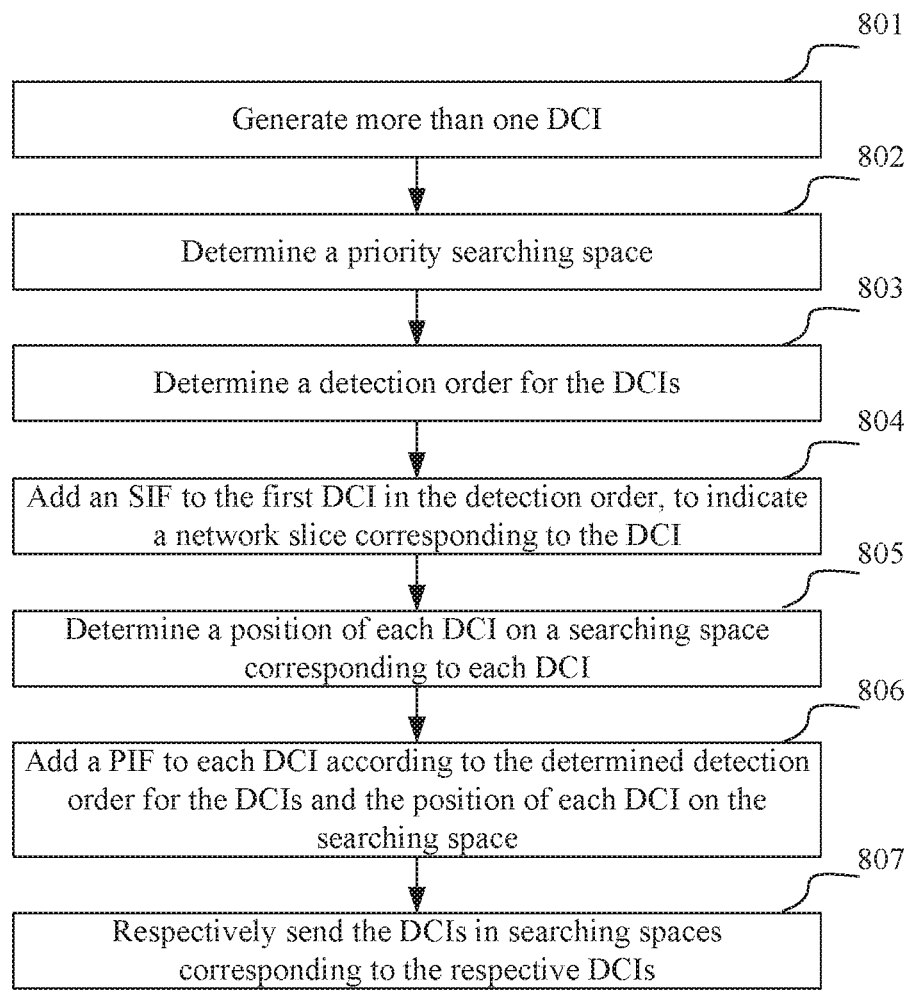
FIG. 8a shows a flow chart outlining a method for DCI transmission at a base station side according to an embodiment of the present disclosure.

FIG. 8a shows a flow chart outlining a method for DCI transmission at a base station side according to an embodiment of the present disclosure. As shown in FIG. 8a, the method may include:

Step 801: the base station generates more than one DCI according to scheduling information of a UE.

Step 802: the base station determines a priority searching space;

Step 803: the base station determines a detection order for the more than one DCI;

As previously described, the base station may determine the detection order for the more than one DCI by sorting the DCIs or directly specifying a DCI order.

Further, in some embodiments of the present disclosure, when determining the detection order for the DCIs, it is also necessary to first determine whether a network slice corresponding to the priority searching space schedules data for the UE, and if yes, a DCI of the network slice corresponding to the priority searching space is made the first DCI in the detection order of the DCIs.

Step 804: the base station adds a slice indication field, SIF, to the first DCI in the detection order, to indicate a network slice corresponding to the DCI.

Step 805: the base station determines a position of each DCI on a searching space corresponding to each DCI, in which the searching space corresponding to the first DCI in the detection order is the priority searching space.

Step 806: the base station adds a position indication field, PIF, to each DCI according to the determined detection order for the DCIs and the position of each DCI on the searching space corresponding to each DCI, to indicate the position of a next DCI, in which the last DCI in the DCI detection order will indicate the position of the first DCI.

Step 807: the base station respectively sends the more than one DCI in the searching spaces corresponding to the respective more than more DCI.

For example, the base station sends the first DCI in the DCI detection order in the priority searching space; and sends the other DCIs in searching spaces of network slices corresponding to the other DCIs respectively.

Figure 8B:
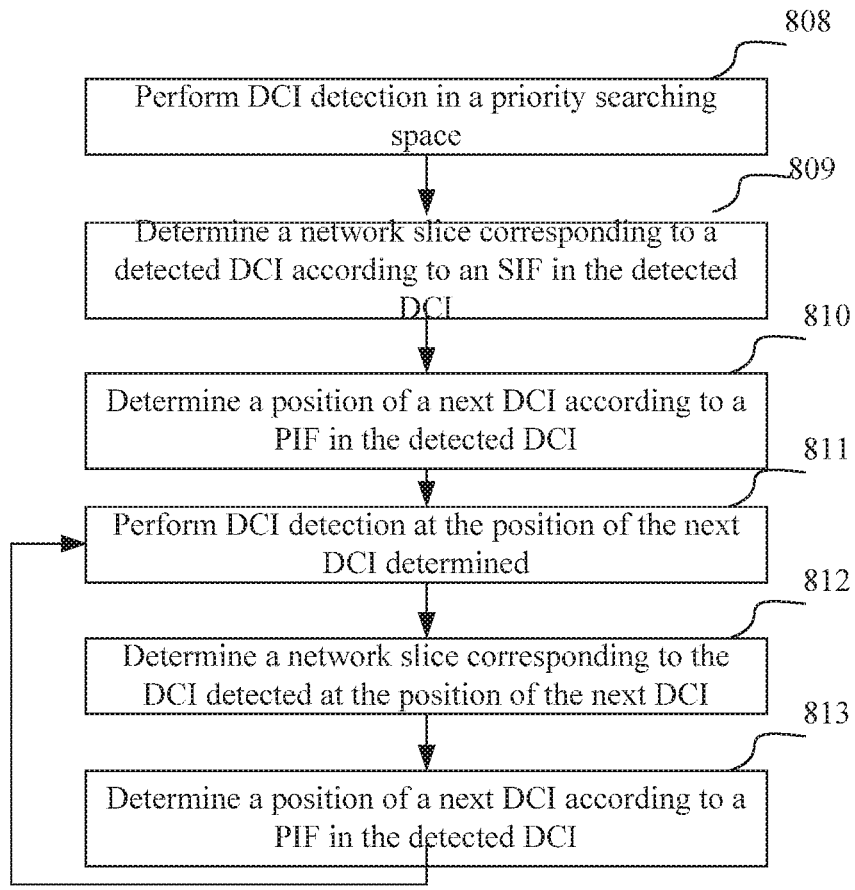
FIG. 8b shows a flow chart outlining a method for DCI transmission at a UE side according to an embodiment of the present disclosure.

FIG. 8b shows a flow chart outlining a method for DCI transmission at a UE side, which may also be referred to as a UE-side DCI detecting method, according to an embodiment of the present disclosure. As shown in FIG. 8b, the method may include:

Step 808: the UE performs DCI detection in a predetermined priority searching space, and proceeds to Step 809 after detecting a DCI in the predetermined priority searching space.

Step 809: the UE determines a network slice corresponding to the detected DCI in the priority searching space according to an SIF field in the detected DCI in the priority searching space.

Step 810: the UE determines a position of a next DCI of the detected DCI in the priority searching space according to a PIF in the detected DCI in the priority searching space.

Step 811: the UE performs DCI detection at the position of the next DCI determined, and proceeds to Step 812 after detecting a DCI at the position of the next DCI.

Step 812: the UE determines a network slice corresponding to the DCI detected at the position of the next DCI according to a network slice corresponding to a searching space where the DCI is detected.

As previously described, the searching spaces and the network slices are corresponding to each other in the exclusive SS mode, and if the UE is scheduled by a certain network slice, and in this embodiment, except the first DCI in the detection order, the base station will send a DCI of a network slice in a searching space corresponding to the network slice. Therefore, in this step, a network slice corresponding to a DCI may also be determined according to a searching space in which the DCI is located, without adding a slice indication field, SIF, to the DCI.

Step 813: the UE determines a position of a next DCI of the DCI detected at the position of the next DCI according to a PIF field in the detected DCI and then returns to Step 811, until all DCIs are detected.

If no DCI is detected at the determined position of the next DCI, the UE will continue to perform blind detection until the next DCI is found; or the UE may perform blind detection of the next DCI in a searching space corresponding to the next DCI according to a DCI detection order configured by the base station.

Similar to example 3, by establishing the link relationship between the DCIs, through one DCI, the position of a next DCI can be directly determined. That is, after one DCI is found, the positions of all the other DCIs can be sequentially determined, without performing blind detection for all the DCIs one by one, thereby greatly reducing the complexity of blind detection, and reducing the power consumption and the time delay of DCI blind detection of the UE. Further, by setting the priority searching space, the time and complexity of blind detection of the first DCI performed by the UE can be further reduced, so as to further reduce the complexity of blind detection performed by the UE, and reduce the power consumption and the time delay of DCI blind detection of the UE.

EXAMPLE 5

Applied to the Exclusive SS Mode

If data is scheduled for the UE over consecutive TTIs, then on the basis of Example 3, a DCI in a current TTI may further indicate network slices that schedule the data for the UE on the next TTI. For example, a bitmap field (BMF) may be added to the DCI to indicate the network slices that schedule the data for the UE on the next TTI using a bitmap. Therefore, in the next TTI, the UE will search for DCIs in the searching spaces of the network slices, so as to reduce the searching spaces for the blind detection performed by the UE in the next TTI, thereby further reducing the complexity and time delay of the blind detection performed by the UE, and reducing the power consumption of the UE.

Specifically, generally the number of bits contained in a bitmap field corresponds to the number of network slices, and each bit corresponds to a network slice. When a certain bit in the bitmap field has a value of 0, it represents that a network slice corresponding to the bit does not schedules data for the UE in the next TTI; when a bit has a value of 1, it represents that a network slice corresponding to the bit schedules data for the UE in the next TTI, and vice versa. In this way, through the bitmap field, it can be determined that which network slices schedule data for the UE in the next TTI. Therefore, the UE can perform blind detection starting from the searching spaces of these network slices in the next TTI.

Figure 9:
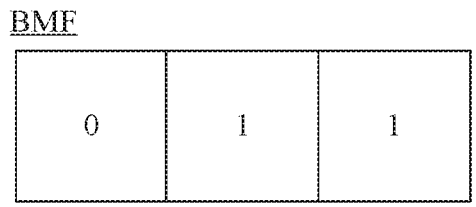
FIG. 9 shows an example of a bitmap field according to an embodiment of the present disclosure.

FIG. 9 shows an example of a bitmap field according to an embodiment of the present disclosure. As can be seen from FIG. 9, the bitmap field contains 3 bits, i.e. for 3 network slices in total. Since the value of the bitmap field is 011, it indicates that the network slice 2 and the network slice 3 both schedule data for the UE in the next TTI, while the network slice 1 does not schedule data for the UE.

Figure 10:
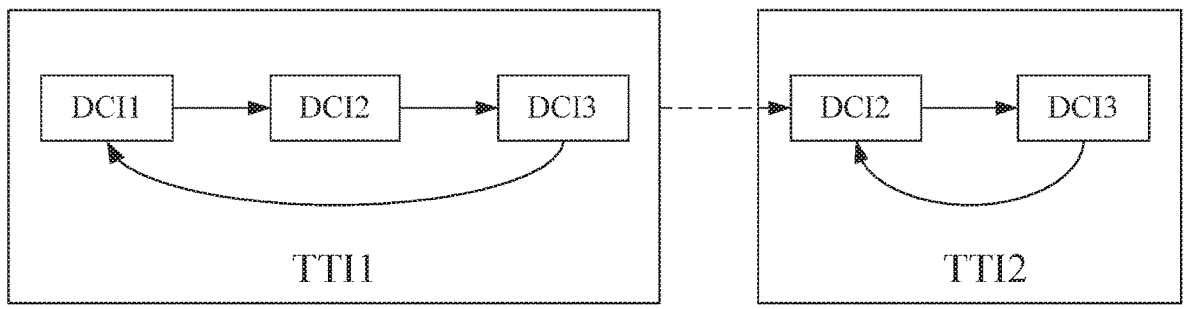
FIG. 10 shows an example of a link relationship between DCIs according to an embodiment of the present disclosure.

Further, an example of a link relationship between DCIs according to an embodiment may also refer to FIG. 10. As shown in FIG. 10, in TTI1, DCI1 will indicate the position of DCI2, while DCI2 will indicate the position of DCI3 which will indicate the position of DCI1. In TTI2, DCI2 will indicate the position of DCI3, and DCI3 will indicate the position of DCI2. Further, the DCI in TTI1 will also indicate, through the bitmap field, that the network slices that schedule data for the UE within TT2 are the network slice 2 and network slice 3 (i.e., only DCI2 and DCI3). In this way, in each TTI, after blindly detecting one DCI, the UE can sequentially detect other DCIs transmitted in the TTI according to the link relationship between the DCIs. Further, after blindly detecting a DCI in a TTI, the UE can determine which network slices in the next TTI schedule data for the UE according to a bitmap field in the DCI, and chooses to perform blind detection starting from the searching spaces of the network slices when performing blind detection in the next TTI, so as to reduce the time for finding the first DCI, achieving the purposes of further reducing the complexity and time delay of the blind detection, and further reducing the power consumption of the UE.

Hereinafter, the method for DCI transmission in the example will be described in detail with reference to the accompanying drawings.

Figure 11A:
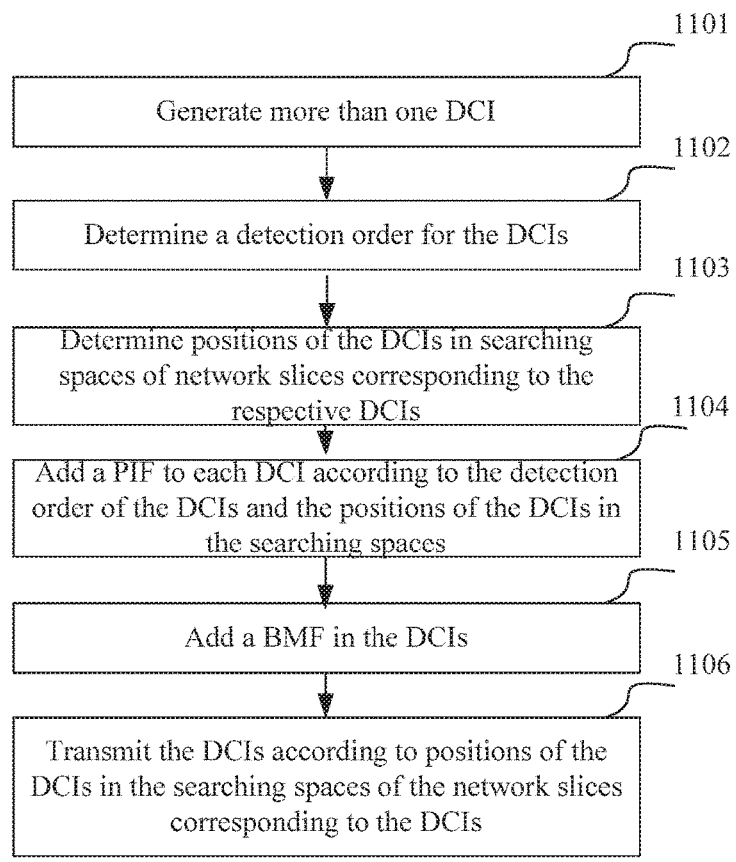
FIG. 11a shows a flow chart outlining a method for DCI transmission at a base station side according to an embodiment of the present disclosure.

FIG. 11a shows a flow chart outlining a method for DCI transmission at a base station side according to an embodiment of the present disclosure. As shown in FIG. 11a, the method may include:

Step 1101: the base station generates more than one DCI according to scheduling information of a UE.

Step 1102: the base station determines a detection order for the more than one DCI.

As previously described, in some embodiments, the detection order of the more than one DCI may be determined by sorting the DCIs or specifying a DCI order.

Step 1103: the base station determines positions of the more than one DCI in searching spaces corresponding to the respective more than one DCI.

Step 1104: the base station adds a position indication field, PIF, to each DCI according to the determined detection order of the DCIs and the positions of the more than one DCI in the searching spaces corresponding to respective more than one DCI, to indicate the position of a next DCI in the detection order, where the last DCI in the detection order will indicate the position for detecting the first DCI.

Step 1105: the base station adds a bitmap field, BMF, to the more than one DCI to indicate a network slice that schedules data for the UE in the next TTI.

Step 1106: the base station sends the more than one DCI at positions in the searching spaces corresponding to the respective more than one DCI.

Figure 11B:
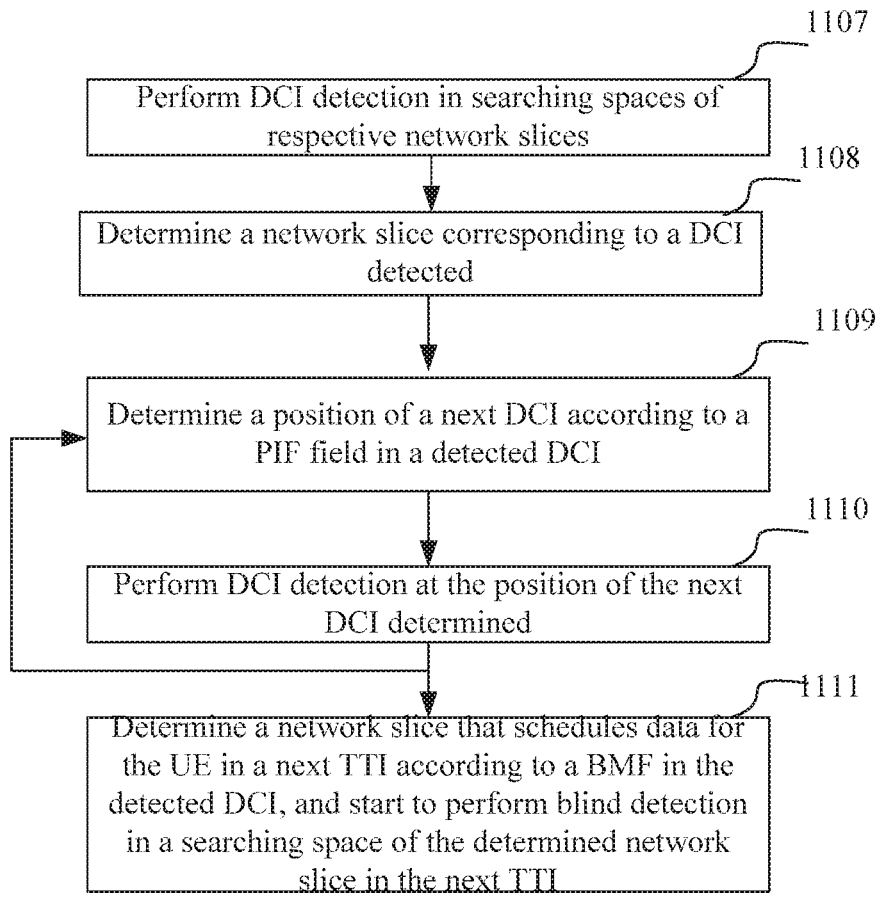
FIG. 11b shows a flow chart outlining a method for DCI transmission at a UE side according to an embodiment of the present disclosure.

FIG. 11b shows a flow chart outlining a method for DCI transmission at a UE side, which may also be referred to as a UE-side DCI detecting method, according to an embodiment of the present disclosure. As shown in FIG. 11b, the method may include:

Step 1107: the UE performs DCI detection in searching spaces of respective network slices, until one DCI is detected.

Step 1108: the UE determines a network slice corresponding to the DCI detected according to a network slice corresponding to a searching space where the DCI is detected.

Step 1109: the UE determines a position of a next DCI according to a PIF field in the detected DCI.

Step 1110: the UE performs DCI detection at the determined position of the next DCI, and returns to Step 1108 after detecting one DCI, until all DCIs are detected.

If no DCI is detected at the determined position of the next DCI, the UE will continue the blind detection until a next DCI is found; or the UE may perform blind detection of a next DCI in a searching space corresponding to the next DCI according to a DCI detection order configured by the base station.

Step 1111: the UE determines a network slice that schedules data for it in a next TTI according to a bitmap field, BMF, in the detected DCI, and start to perform blind detection in a searching space of the determined network slice in the next TTI.

Similarly to example 3, by establishing the link relationship between the DCIs, the method directly determines the position of a next DCI after one DCI is detected blindly, without performing blind detection for all the DCIs one by one, thereby greatly reducing the complexity of blind detection performed by the UE, and reducing the power consumption and the time delay of DCI blind detection of the UE. Further, according to the method, the DCI transmission scheme is expanded in the aspect of time line, by setting the bitmap field, BMF, the UE in the current TTI can know which network slices schedule data for it in the next TTI, so that the UE can start to perform a new round of blind detection directly from the searching spaces of the network slices in the next TTI. Since the searching spaces of these network slices definitely contain DCIs, the time for the UE to blindly detect the first DCI can be shortened, so as to further reduce the time and complexity of blind detection performed by the UE on the basis of the scheme shown in the example 3, thereby further reducing the power consumption of the UE.

EXAMPLE 6

Applied to the Exclusive SS Mode

In the example, on the basis of the example 3, in order to further reduce the time consumed by the UE to blindly detect the first DCI, DCIs can be set to two levels, in which a first level of DCI is DCI containing common scheduling information of different network slices, and referred to as common DCI; the second level of DCI is DCI containing specific scheduling information of different network slices, and referred to as specific DCI. The common DCI is mainly used to indicate which network slices schedule data for the UE within the TTI and to indicate the position of a specific DCI within the current TTI. The specific DCI has a link relationship to indicate the position of a next specific DCI, in addition to the scheduling data of its corresponding network slice. Further, the base station may pre-specify the searching space of a common DCI, for example, dividing a small area from the searching space of a certain network slice as the searching space of the common DCI. In this way, the UE can quickly blindly detect a common DCI in the pre-specified searching space of the common DCI, so as to find a specific DCI according to the position of the specific DCI indicated in the common DCI, and then find all the specific DCIs in sequence according to the position of a next specific DCI indicated in the specific DCI, thereby greatly reducing the complexity and time delay of the blind detection performed by the UE and reducing the power consumption of the UE.

In some embodiments of the present disclosure, the common DCI may use a bitmap to indicate which network slices in the current TTI have scheduled data for the UE. For example, the common DCI may include a bitmap field as shown in FIG. 9, to indicate which network slices in the current TTI have scheduled data for the UE. Specifically, generally the number of bits contained in the bitmap field corresponds to the number of network slices, and each bit corresponds to a network slice. When a certain bit in the bitmap field has a value of 0, it represents that a network slice corresponding to the bit does not schedules data for the UE in the next TTI; when a bit has a value of 1, it represents that a network slice corresponding to the bit schedules data for the UE in the next TTI, and vice versa. In this way, through the bitmap field, it can be determined that which network slices schedule data for the UE in the next TTI.

Figure 12:
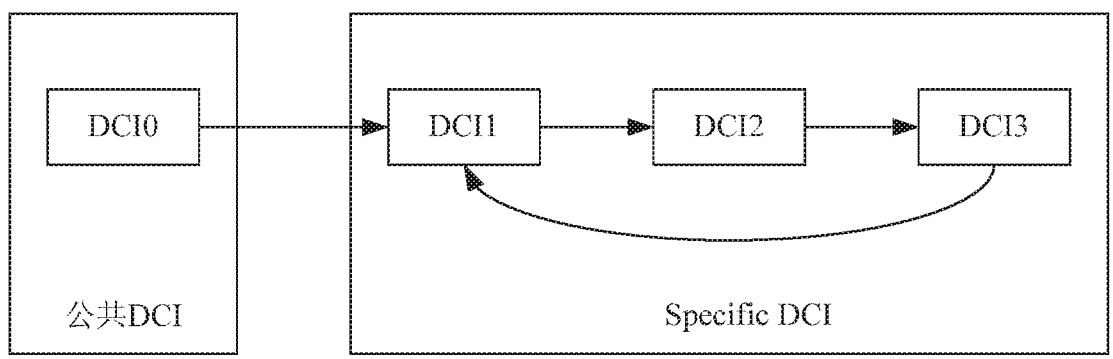
FIG. 12 shows an example of a link relationship between DCIs according to an embodiment of the present disclosure.

An example of a link relationship between DCIs as described in the embodiments may refer to FIG. 12. As shown in FIG. 12, within one TTI, DCI0 is a common DCI whose searching space may be a pre-specified searching area divided from the searching space of a certain network slice, and the common DCI0 indicates the position of DCI1 in the specific DCIs, DCI1 indicates the position of DCI2, DCI2 indicates the position of DCI3, and DCI3 indicates the position of DCI1. Thus, the UE will first perform blind detection in the searching space of the common DCI, first find DCI0, and further detect DCI1, DCI2, and DCI3 in turn as indicated by DCI0.

Hereinafter, the method for DCI transmission in the example will be described in detail with reference to the accompanying drawings.

Figure 13A:
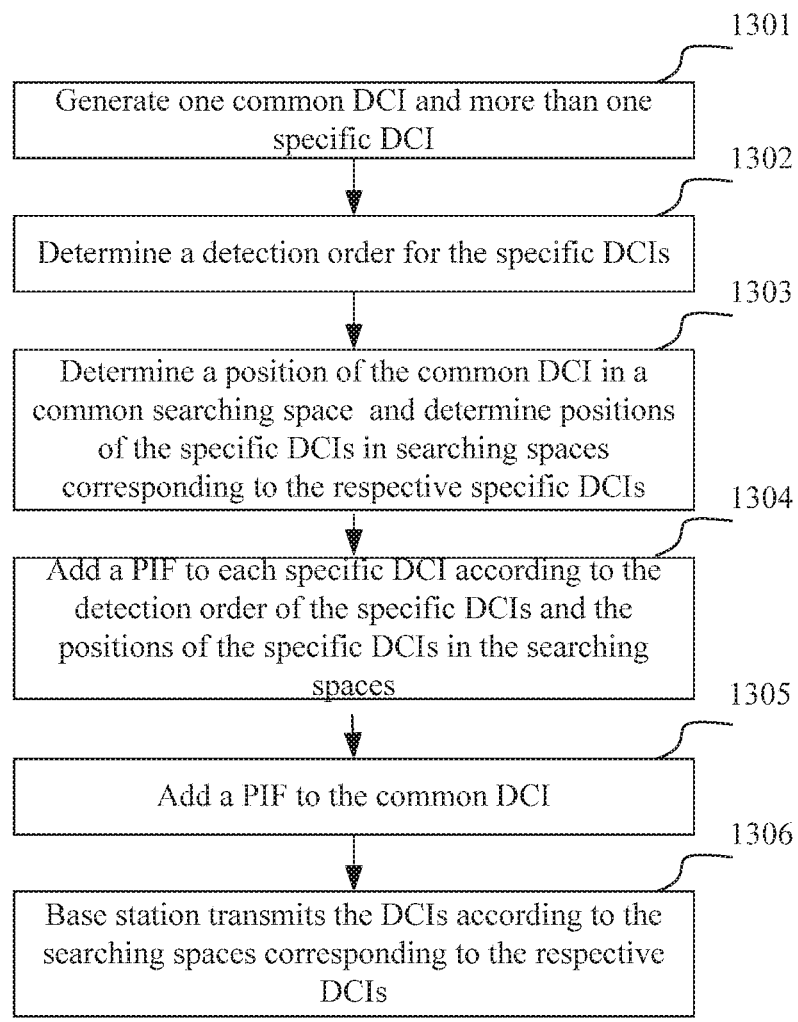
FIG. 13a shows a flow chart outlining a method for DCI transmission at a base station side according to an embodiment of the present disclosure.

FIG. 13a shows a flow chart outlining a method for DCI transmission at a base station side according to an embodiment of the present disclosure. As shown in FIG. 13a, the method may include:

Step 1301: the base station generates one common DCI and more than one specific DCI according to scheduling information of a UE, in which the common DCI includes a bitmap field used to indicate a network slice that schedules data for the UE in the current TTI; each specific DCI corresponds to a network slice that schedules data for the UE.

Step 1302: the base station determines a detection order for the more than one specific DCI.

In some embodiments, the base station may determine the detection order for the specific DCIs by sorting or specifying the order for the specific DCIs.

Step 1303: the base station determines a position of the common DCI in a common searching space and determines positions of the more than one specific DCI in searching spaces corresponding to the respective more than one specific DCI.

Step 1304: the base station adds a position indication field, PIF, to each specific DCI according to the determined detection order of the specific DCIs and the positions of the more than one specific DCI in the searching spaces corresponding to the respective more than one specific DCI, to indicate the position of a next specific DCI in the detection order, in which the last specific DCI in the detection order will indicate the position of the first specific DCI.

Step 1305: the base station adds a position indication field, PIF, to the common DCI to indicate the position of any specific DCI.

Step 1306: the base station sends the common DCI and the specific DCIs in respective corresponding searching spaces.

Figure 13B:
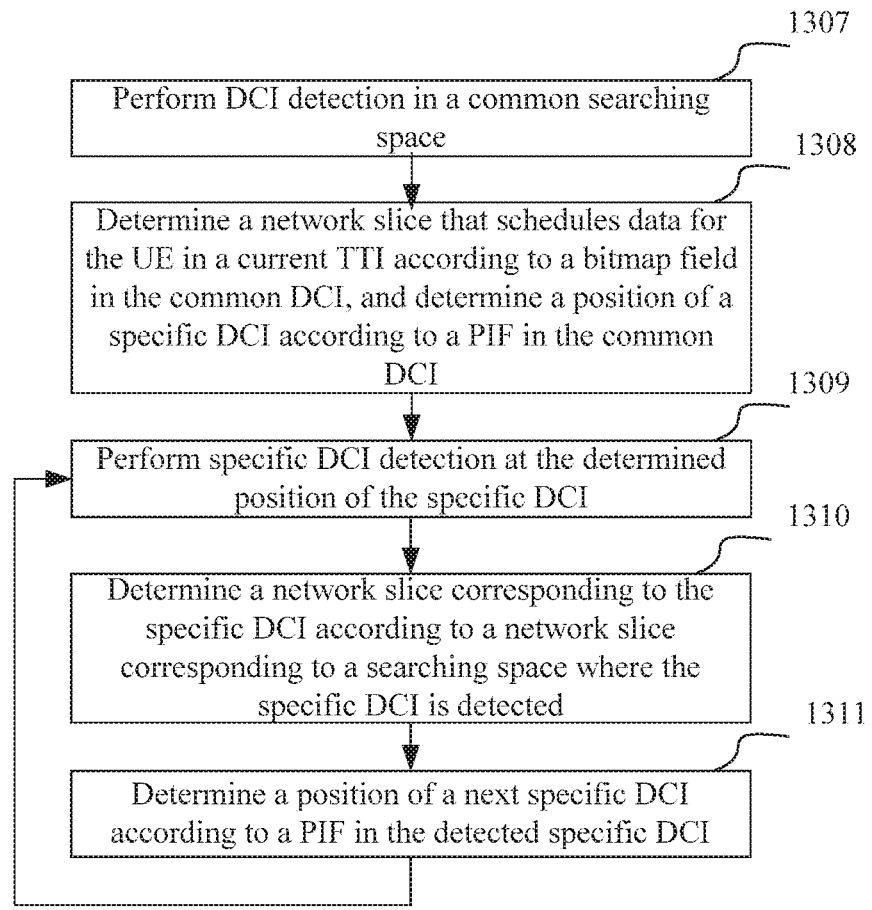
FIG. 13b shows a flow chart outlining a method for DCI transmission at a UE side according to an embodiment of the present disclosure.

FIG. 13b shows a flow chart outlining a method for DCI transmission at a UE side, which may also be referred to as a UE-side DCI detecting method, according to an embodiment of the present disclosure. As shown in FIG. 13b, the method may include:

Step 1307: the UE performs common DCI detection in a common searching space.

Step 1308: after detecting a common DCI, the UE determines a network slice that schedules data for it in a current TTI according to a bitmap field in the detected common DCI, and further determines a position of a specific DCI according to a PIF field in the detected common DCI.

Step 1309: the UE performs specific DCI detection at the determined position of the specific DCI above, and proceeds to Step 1310 after detecting a specific DCI.

Step 1310: the UE determines a network slice corresponding to the specific DCI according to a network slice corresponding to a searching space where the specific DCI is detected.

Step 1311: the UE determines a position of a next specific DCI according to a PIF in the detected specific DCI, and then returns to Step 1309, until all the specific DCIs are detected.

If no DCI is detected at the determined position of the next DCI, the UE continues to perform blind detection, until a next DCI is found; or the UE may perform blind detection of a next DCI in a searching space corresponding to the next DCI according to a DCI detection order configured by the base station.

Similar to example 3, by establishing the link relationship between the DCIs, the method directly determines the position of a next DCI after one DCI is detected blindly, without performing blind detection for all the DCIs one by one, thereby greatly reducing the complexity of blind detection performed by the UE, and reducing the power consumption and the time delay of DCI blind detection of the UE. Further, by setting the two level of DCIs (common DCI and a specific DCI), in the method, the common DCI indicates the position of one specific DCI, and the common DCI is placed in a certain area of the searching space-the common searching space. In this way, since the scope of the range of the common searching space where the common DCI is sent is determined, and its size is limited, the UE can quickly blindly detect the common DCI and further locate other specific DCIs through the link relationship between the DCIs. Therefore, the time and complexity of blind detection performed by the UE can be further reduced.

As can be seen from the various examples above, Example 1 reduces the complexity of the DCI blind detection by padding the DCIs to the fixed same length. The core concepts of Examples 2 to 6 are very similar, both by establishing the link relationship between the DCIs, i.e. directly indicating the position of a next DCI by a DCI, so as to prevent the UE from blindly detecting the respective DCIs one by one.

The following example will be a summary of the DCI transmission methods shown by Examples 2 to Example 6.

Figure 14A:
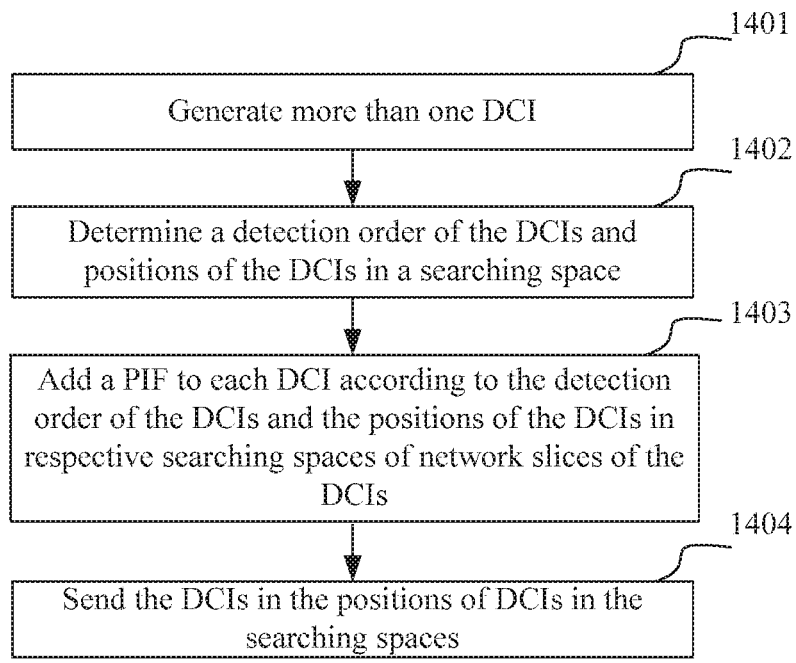
FIG. 14a shows a flow chart outlining a method for DCI transmission at a base station side according to an embodiment of the present disclosure.

FIG. 14a shows a flow chart outlining a method for DCI transmission at a base station side according to an embodiment of the present disclosure. As shown in FIG. 14a, the method includes:

Step 1401: the base station generates more than one DCI according to scheduling information of a UE;

Step 1402: the base station determines a detection order of the DCIs and positions of the DCIs in a searching space;

Step 1403: position indication fields are added to the DCIs according to the detection order of the DCIs and the positions of the DCIs in the searching space; in which, the position indication field is used to indicate positions of next DCIs of the DCIs in the detection order; in which a position indication field in a last DCI in the detection order is used to indicate a position of a first DCI in the detection order; and Step 1404: the DCIs are sent in the searching spaces according to the positions of the DCIs in the searching spaces.

In the method, the determining the detection order of the DCIs includes: determining the detection order of the DCIs by sorting the DCIs or pre-specifying a DCI order.

Corresponding to Example 2, the searching space is a shared searching space; each DCI in the DCIs respectively corresponds to a network slice; also each DCI includes a slice indication field, SIF, to indicate the network slice corresponding to the DCI. Further, each DCI may further include a number indication field to indicate the number of the DCIs contained in the shared searching space.

Corresponding to Example 3, the searching space is a searching space for each network slice; and each DCI in the DCIs respectively corresponds to a network slice.

Corresponding to Example 4, the method further includes: determining a searching space from searching spaces of network slices as a priority searching space. In this case, Step 1402 includes: determining the detection order of the DCIs by sorting the DCIs or pre-specifying a DCI order; in which, if a network slice corresponding to the priority searching space schedules data for the UE, then a DCI of the network slice corresponding to the priority searching space is a first DCI in the detection order. Step 1402 further includes: determining positions of the DCIs in their respective corresponding searching spaces, in which, a searching space corresponding to the first DCI in the detection order is the priority searching space; searching spaces corresponding to DCIs other than the first DCI in the detection order are searching spaces of network slices corresponding to the DCIs other than the first DCI. On the basis, the method further includes: adding a slice indication field to the first DCI in the detection order to indicate the network slice corresponding to the first DCI.

Corresponding to Example 5, the method further includes: adding bitmap fields to the DCIs to indicate network slices that schedule data for the UE in a next transmission time interval.

Corresponding to Example 6, Step 1401 includes: generating a common DCI and more than one specific DCI according to the scheduling information of the UE. Step 1402 includes: determining the detection order of the DCIs by sorting the specific DCIs or pre-specifying a specific DCI order; and determining a position of the common DCI in a common searching space and determining positions of the specific DCIs in searching spaces respectively correspond to the specific DCIs. Step 1403 includes: adding position indication fields to the specific DCIs. On the basis, the method further includes: adding a position indication field to the common DCI to indicate a position of any specific DCI.

Figure 14B:
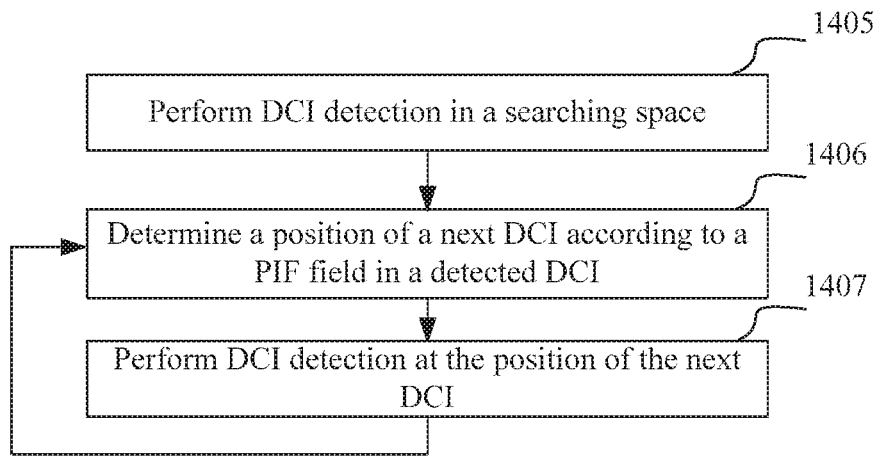
FIG. 14b shows a flow chart outlining a method for DCI transmission at a UE side according to an embodiment of the present disclosure.

FIG. 14b shows a flow chart outlining a method for DCI transmission at a UE side, which may also be referred to as a UE-side DCI detecting method, according to an embodiment of the present disclosure. As shown in FIG. 14b, the method includes:

Step 1405: performing DCI detection in a searching space, and proceeding to Step 1406 after detecting one DCI;

Step 1406: determining a position of a next DCI according to a position indication field in the detected DCI;

Step 1407: performing DCI detection at the position of the next DCI and returning to Step 1406, until all DCIs are detected.

In some embodiments of the present disclosure, if no DCI is detected at the determined position of the next DCI, the UE will continue the blind detection until the next DCI is found; or the UE blindly detects the next DCI according to a DCI detection order configured by the base station.

Corresponding to Example 2, Step 1405 includes: performing the DCI detection in a shared searching space. In this case, the method further includes: determining a network slice corresponding to a DCI according to a slice indication field in the DCI. If the DCI further includes a number indication field, it may be determined whether all DCIs have been detected according to the number indication field in the DCI, and if so, ending the method.

Corresponding to Example 3, Step 1405 includes: performing the DCI detection in a searching space of a network slice. In this case, the method further includes: determining a network slice corresponding to a detected DCI as a network slice corresponding to a searching space where the DCI is located.

Corresponding to Example 4, the performing DCI detection in a searching space in Step 1405 includes: performing DCI detection in a priority searching space; and the method further includes: if a searching space where the DCI is located is the priority searching space, determining a network slice corresponding to the DCI according to a slice indication field in the DCI; if the searching space where the DCI is located is not the priority searching space, determining the network slice corresponding to the detected DCI to be a network slice corresponding to the searching space where the DCI is located.

Corresponding to Example 5, the method further includes: determining a network slice that schedules data for the UE in a next transmission time interval according to a bitmap field in the detected DCI.

Corresponding to Example 6, Step 1405 includes: performing detection for a common DCI in a common searching space.

According to the scheme for establishing a link relationship between the DCIs, the UE may determine the positions of all DCIs one by one according to the link relationship after blindly detecting one DCI, so as to avoid the blind detection of all DCIs one by one, thereby reducing the complexity and time delay of blind detection of the DCIs, and reducing the power consumption of the UE.

Figure 15:
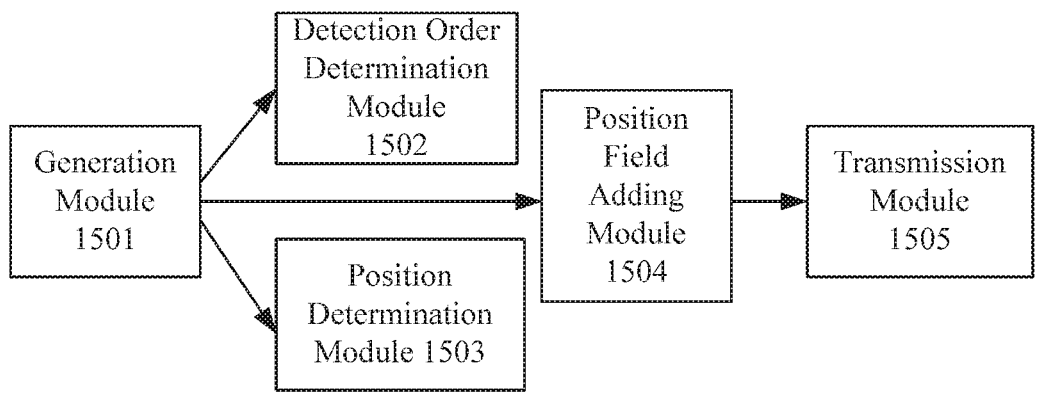
FIG. 15 is a schematic diagram of components of a base station according to an embodiment of the present disclosure.
Figure 16:
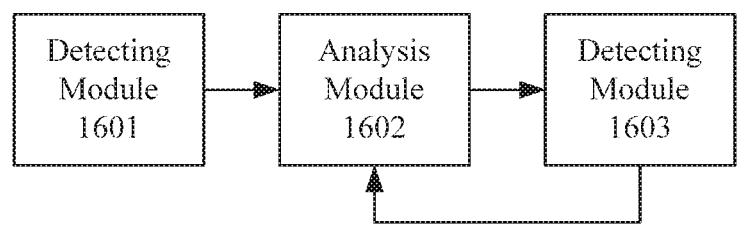
FIG. 16 is a schematic diagram of components of a UE according to an embodiment of the present disclosure.
Figure 17:
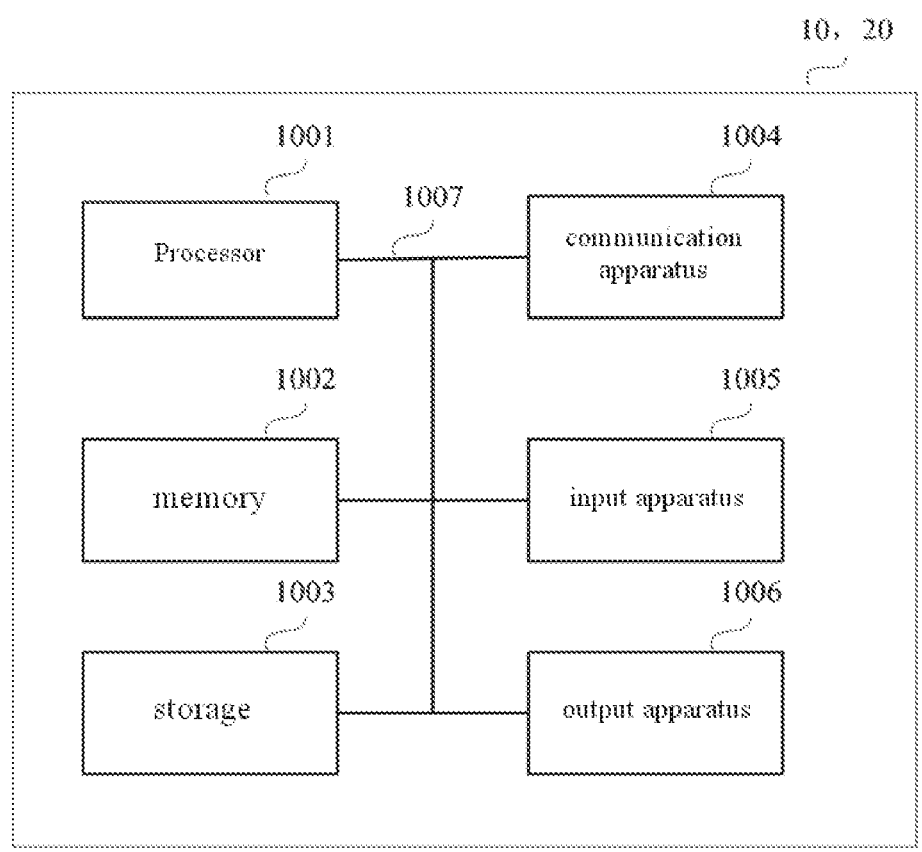
FIG. 17 is a schematic diagram of a hardware structure of a wireless base station and a user equipment according to an embodiment of the present disclosure.

Corresponding to the above DCI transmission methods, the embodiments of the present disclosure also provide a base station and a UE for realizing the DCI transmission methods. Components of the base station is shown in FIG. 15, and it can be seen from FIG. 15 that the base station includes the following modules:

a generation module 1501 to generate more than one DCI according to scheduling information of a UE;

a detection order determination module 1502 to determine a detection order of the DCI;

a position determination module 1503 to determine positions of the more than one DCI in a searching space;

a position field adding module 1504 to add a position indication field to a respective DCI according to the detection order of the more than one DCI and the positions of the more than one DCI in the searching spaces; in which, the position indication field is used to indicate a position of a next DCI of the respective DCI in the detection order; in which, a position indication field in a last DCI in the detection order is used to indicate a position of a first DCI in the detection order; and a transmission module 1505 to transmit the more than one DCI in the searching space according to the positions of the more than one DCI in the searching space FIG. 16 is a schematic diagram of components of a UE according to an embodiment of the present disclosure. As shown in FIG. 16, the UE includes the following modules:

a detecting module 1601 to perform DCI detection in a searching space, and trigger an analysis module 1602 to operate after the detecting module 1601 detects a DCI;

the analysis module 1602 to determine a position of a next DCI according to a position indication field in the currently detected DCI; and a detecting module 1603 to perform DCI detection at the position of the next DCI, and trigger the analysis module 1602 to operate after the detecting module 1603 detects the next DCI.

The respective modules shown in FIG. 15 and FIG. 16 described above may implement their respective functions through the various methods in FIGS. 4 to 14 described above, and will not be described in detail herein.

In addition, the embodiments of the present disclosure further provide another base station and UE to realize the DCI transmission methods. The base station may include the following modules:

a generation module to generate more than one DCI according to scheduling information of a UE, in which a respective DCI includes an SIF to indicate a network slice corresponding to the respective DCI;

a padding module to perform bit padding for the generated more than one DCI according to a preset DCI length, to obtain more than one DCI with a same length; and a transmission module to transmit the more than one DCI with the same length in a shared searching space.

Correspondingly, the UE may include the following modules:

a detecting module to perform DCI detection in a shared searching space according to a preset DCI length;

a correspondence determination module to determine a network slice corresponding to a detected DCI according to a slice indication field, SIF, in the detected DCI.

The respective modules may implement their respective functions through the various methods shown in FIGS. 1 to 3, and will not be described in detail herein.

It should be noted that not all of the steps and modules in the above described flow charts and block diagrams are necessary, but certain steps or modules may be omitted as demanded. The sequence of the steps is not fixed and may be adjusted as demanded. The division of the respective modules is merely to facilitate the description of the functions adopted by the modules, and in actual implementation, one module may be divided into a plurality of modules, the functions of the plurality of modules may also be implemented by a same module, and these modules may be provided in a same device or in different devices.

In addition, the block diagrams that have been used to describe the above embodiments illustrate blocks in functional units. These functional blocks (components) may be implemented in arbitrary combinations of hardware and/or software. Also, the means for implementing each functional block is not particularly limited. That is, each functional block may be implemented by one piece of apparatus that is physically and/or logically aggregated, or may be implemented by directly and/or indirectly connecting two or more physically and/or logically separate pieces of apparatus (via wire or wireless, for example) and using these multiple pieces of apparatus.

For example, a radio base station, a user equipment and so on according to an embodiments of the present disclosure may function as a computer that executes the processes of the radio communication method of the present disclosure. FIG. 6 is a diagram to illustrate an example hardware structure of a radio base station and a user equipment according to an embodiment of the present disclosure. Physically, the above-described radio base station 10 and user equipment 20 may be formed as a computer apparatus that includes a processor 1001, a memory 1002, a storage 1003, a communication apparatus 1004, an input apparatus 1005, an output apparatus 1006 and a bus 1007.

In addition, in the following description, the word "apparatus" may be replaced by "circuit", "device", "unit", and so on. Note that the hardware structures of a radio base station 10 and a user equipment 20 may be designed to include one or more of each apparatus illustrated in the drawing, or may be designed not to include a part of the apparatus.

For example, although only one processor 1001 is illustrated, a plurality of processors may be provided. Furthermore, processes may be implemented with one processor, or processes may be implemented in sequence, or in different manners, on more than one processor. Note that the processor 1001 may be implemented with more than one chip.

Each function of the radio base station 10 and the user equipment 20 is implemented for example by reading predetermined software (programs) on hardware such as the processor 1001 and the memory 1002, so as to allow the processor 1001 to do calculations to control communications performed by the communication apparatus 1004, and control reading and/or writing data from the memory 1002 and the storage 1003.

The processor 1001 may control the whole computer by, for example, running an operating system. The processor 1001 may be formed with a central processing unit (CPU) which includes interfaces with a peripheral apparatus, a control apparatus, a computing apparatus, a register, and so on.

Furthermore, the processor 1001 reads programs (program codes), software modules or data, from the storage 1003 and/or the communication apparatus 1004, into the memory 1002, and executes various processes according to them. As the programs, programs that allow a computer to execute at least part of the operations of the above-described embodiments may be used.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as "register", "cache", "main memory (primary storage apparatus)", and so on. The memory 1002 may store executable programs (program codes), software modules, and so on for implementing the radio communication methods according to embodiments of the present disclosure.

The storage 1003 is a computer-readable recording medium, and may be constituted by, for example, at least one of a flexible disk, a floppy (registered trademark) disk, a magneto-optical disk (for example, a compact disc (CD-ROM (Compact Disk ROM), and so on), a digital versatile disc, a Blu-ray (registered trademark) disk), a removable disk, a hard disk driver, a smart card, a flash memory device (for example, a card, a stick, a key driver, etc.), a magnetic stripe, a database, a server, and/or other appropriate storage media. The storage 1003 may be referred to as "secondary storage apparatus".

The communication apparatus 1004 is hardware (transmitting/receiving device) for allowing inter-computer communications by using wired and/or wireless networks, and may be referred to as, for example, "network device", "network controller", "network card", "communication module", and so on. The communication apparatus 1004 may include a high frequency switch, a duplexer, a filter, a frequency synthesizer, and so on, in order to realize, for example, frequency division duplex (FDD) and/or time division duplex (TDD).

The input apparatus 1005 is an input device for receiving input from the outside (for example, a keyboard, a mouse, a microphone, a switch, a button, a sensor, and so on). The output apparatus 1006 is an output device that implements output to the outside (for example, a display, a speaker, an LED (Light Emitting Diode) lamp, and so on). The input apparatus 1005 and the output apparatus 1006 may be provided in an integrated structure (for example, a touch panel).

Furthermore, the pieces of apparatus such as the processor 1001, the memory 1002 and others, are connected by the bus 1007 for communicating information. The bus 1007 may be formed with a single bus, or may be formed with different buses between pieces of apparatus.

Also, the radio base station 10 and the user equipment 20 may be structured to include hardware such as a microprocessor, a digital signal processor (DSP), an ASIC (Application-Specific Integrated Circuit), a PLD (Programmable Logic Device), and an FPGA (Field Programmable Gate Array), and so on, and part or all of the functional blocks may be implemented by the hardware. For example, the processor 1001 may be implemented with at least one of these pieces of hardware.

In addition, the terminology used in this specification and the terminology that is needed to understand this specification may be replaced by other terms that convey the same or similar meanings. For example, "channel" and/or "symbol" may be replaced by "signal (or "signaling")." Also, "signal" may be "message". "Reference signal" may be abbreviated as "RS", and may be referred to as "pilot", "pilot signal", and so on, depending on which standard applies. Furthermore, "component carrier (CC)" may be referred to as "cell", "frequency carrier", "carrier frequency", and so on.

Furthermore, a radio frame may be constituted by one or more periods (frames) in the time domain. Each of the one or more periods (frames) constituting the radio frame may be referred to as a subframe. Furthermore, a subframe may be constituted by one or more slots in the time domain. The subframe may be a fixed length of time (e.g., 1 ms) independent of the numerology.

Furthermore, a slot may be constituted by one or more symbols (OFDM (Orthogonal Frequency Division Multiplexing) symbols, SC-FDMA (Single Carrier Frequency Division Multiple Access) symbols, and so on) in the time domain. In addition, the time slot may also be a time unit based on the numerology. Also, the time slot may also include a plurality of minislots. Each minislot may be constituted by one or more symbols in the time domain. In addition, a minislot may also be referred to as a subslot.

"radio frame", "subframe", "slot", "minislot" and "symbol" all represent time units in signal communication. "radio frame", "subframe", "slot", "minislot" and "symbol" may be each called by other applicable names. For example, one subframe may be referred to as a transmission time interval (TTI), a plurality of consecutive subframes may be referred to as a TTI, or one slot or one minislot may be referred to as a TTI. That is, a subframe and/or a TTI may be a subframe (1 ms) in existing LTE, may be a period shorter than 1 ms (for example, one to thirteen symbols), or may be a period longer than 1 ms. In addition, a unit indicating a TTI may also be referred to as a slot, a minislot, or the like, instead of a subframe.

Herein, a TTI refers to the minimum time unit of scheduling in radio communication. For example, in LTE systems, a radio base station schedules the allocation of radio resources (such as the frequency bandwidth and transmission power that can be used by each user equipment) for each user equipment in TTI units. In addition, the definition of TTI is not limited to this.

The TTI may be the transmission time unit of channel-encoded data packets (transport blocks), code blocks and/or codewords, or may be the processing unit of scheduling, link adaptation, and so on. In addition, when a TTI is given, a time interval (e.g., the number of symbols) actually mapped to the transport blocks, code blocks, and/or codewords may also be shorter than the TTI.

In addition, when one time slot or one mini time slot is called a TTI, more than one TTI (i.e., more than one time slot or more than one mini time slot) may also be a minimum time unit for scheduling. Further, the number of slots (the number of minislots) constituting the minimum time unit for scheduling can be controlled.

A TTI having a time length of 1 ms may be referred to as a normal TTI (TTI in LTE Rel. 8 to 12), a standard TTI, a long TTI, a normal subframe, a standard subframe, or a long subframe, and so on. A TTI that is shorter than the normal TTI may be referred to as a compressed TTI, a short TTI, a partial TTI/fractional TTI, a compressed subframe, a short subframe, a mini time slot, or a subslot, and so on.

In addition, a long TTI (e.g., a normal TTI, a subframe, etc.) may be replaced with a TTI having a time length exceeding 1 ms, and a short TTI (e.g., a compressed TTI, etc.) may also be replaced with a TTI having a TTL length shorter than that of a long TTI and longer than 1 ms.

A resource block (RB) is the unit of resource allocation in the time domain and the frequency domain, and may include one or a plurality of consecutive subcarriers in the frequency domain. In addition, an RB may include one or more symbols in the time domain, and may be one slot, one minislot, one subframe, or one TTI in length. One TTI and one subframe each may be constituted by one or more resource blocks. Besides, one or more RBs may be referred to as a Physical RB (PRB), a Sub-Carrier Group (SCG), a Resource Element Group (REG), a PRB pair, an RB pair, and so on.

Furthermore, a resource block may be constituted by one or more resource elements (REs). For example, one RE may be a radio resource field of one subcarrier and one symbol.

In addition, the above-described structures of the radio frame, the subframe, the slot, the minislot, the symbol, and so on are merely examples. For example, configurations such as the number of subframes included in a radio frame, the number of slots included in a subframe or a radio frame, the number of minislots included in a slot, the number of symbols and RBs included in a slot or a minislot, the number of subcarriers included in an RB, the number of symbols in a TTI, the symbol duration and the cyclic prefix (CP) duration may be changed in various ways.

Further, the information and parameters described in this specification may be represented in absolute values, or in relative values with respect to predetermined values, or may be represented in other information formats. For example, radio resources may be indicated by predetermined indexes. In addition, equations to use these parameters and so on may be different from those explicitly disclosed in this specification.

The names used for the parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and so on described in this specification may be represented by using a variety of different technologies. For example, the data, commands, instructions, information, signals, bits, symbols and chips, all of which may be referenced throughout the herein-contained description, may be represented by voltages, currents, electromagnetic waves, magnetic fields or particles, optical fields or photons, or any combination of these.

Also, the information, signals, and so on may be output from higher layers to lower layers and/or from lower layers to higher layers. The information, signals, and so on may be input and output via a plurality of network nodes.

The information, signals, and so on that are input and/or output may be stored in a specific location (for example, a memory), or may be managed using a management table. The information, signals, and so on to be input and/or output can be overwritten, updated or appended. The information, signals, and so on that are output may be deleted. The information, signals, and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBS) and so on), MAC (Medium Access Control) signaling and so on), and other signals and/or combinations of these.

Note that physical layer signaling may be referred to as "L1/L2 (Layer 1/Layer 2) control information (L1/L2 control signals)," and so on. Also, RRC signaling may be referred to as "RRC messages", and may be, for example, an RRC connection setup message, an RRC connection reconfiguration message, and so on. Also, MAC signaling may be reported using, for example, MAC control elements (MAC CEs).

Also, reporting of predetermined information (for example, reporting "is X") does not necessarily have to be sent explicitly, and may be sent implicitly (by, for example, not reporting the predetermined information or by reporting other information).

Decisions may be made in values represented by one bit (0 or 1), may be made in Boolean values that represent true or false, or may be made by comparing numerical values (for example, comparison against a predetermined value).

Software, whether it is referred to as "software", "firmware", "middleware", "microcode", or "hardware description language", or called by other names, should be interpreted broadly, to mean instructions, instruction sets, codes, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used herein are used interchangeably.

As used herein, the terms "base station (BS)", "radio base station", "eNB", "cell", "sector", "cell group", "carrier", and "component carrier" may be used interchangeably. A base station may be referred to as a "fixed station", "NodeB", "eNodeB (eNB)", "access point", "transmission point", "receiving point", "femto cell", "small cell", and so on.

A base station can accommodate one or more (for example, three) cells (also referred to as "sectors"). When a base station accommodates a plurality of cells, the entire coverage area of the base station may be partitioned into multiple smaller areas, and each smaller area may provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)", "user terminal", "user equipment (UE)" and "equipment" may be used interchangeably. "Base station" may be referred to as "fixed station", "NodeB", "eNodeB (eNB)", "access point", "transmission point", "receiving point", "femto cell", "small cell", and so on.

"Mobile station" may be referred to, by a person skilled in the art, as "subscriber station", "mobile unit", "subscriber unit", "wireless unit", "remote unit", "mobile device", "wireless device", "wireless communication device", "remote device", "mobile subscriber station", "access equipment", "mobile equipment", "wireless equipment", "remote equipment", "handset", "user agent", "mobile client", "client" or some other suitable terms.

Furthermore, the radio base stations in this specification may be interpreted as user equipments. For example, each aspect/embodiment of the present disclosure may be applied to a configuration in which communications between a radio base station and a user equipment are replaced with communications between a plurality of user equipments (D2D (Device-to-Device)). In this case, the user equipment 20 may have the functions of the radio base station 10 described above. In addition, wording such as "uplink" and "downlink" may be interpreted as "side". For example, an uplink channel may be interpreted as a side channel.

Likewise, the user equipments in this specification may be interpreted as radio base stations. In this case, the radio base station 10 may have the functions of the user equipment 20 described above.

Certain actions which have been described in this specification to be performed by base stations may, in some cases, be performed by upper nodes. In a network consisting of one or more network nodes with base stations, it is clear that various operations that are performed to communicate with the user equipments can be performed by base stations, one or more network nodes (for example, MMES (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods, and/or next-generation systems that are enhanced based on these.

The phrase "based on" as used in this specification does not mean "based only on", unless otherwise specified. In other words, the phrase "based on" means both "based only on" and "based at least on".

Reference to elements with designations such as "first", "second", and so on as used herein does not generally limit the number/quantity or order of these elements. These designations are used herein only for convenience, as a method of distinguishing between two or more elements. In this way, reference to the first and second elements does not imply that only two elements may be employed, or that the first element must precede the second element in some way.

The term "determining" as used herein may encompass a wide variety of actions. For example, to "determining" as used herein may be interpreted to mean making determinations related to calculating, computing, processing, deriving, investigating, looking up (for example, searching a table, a database or some other data structure), ascertaining, and so on. Furthermore, to "determining" as used herein may be interpreted to mean making determinations related to receiving (for example, receiving information), transmitting (for example, transmitting information), inputting, outputting, accessing (for example, accessing data in a memory), and so on. In addition, to "determining" as used herein may be interpreted to mean making determinations related to resolving, selecting, choosing, establishing, comparing, and so on. In other words, to "determining" as used herein may be interpreted to mean making determinations related to some actions.

As used herein, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access. As used herein, two elements may be considered "connected" or "coupled" to each other by using one or more electrical wires, cables and/or printed electrical connections, and, in a number of non-limiting and non-inclusive examples, by using electromagnetic energy such as electromagnetic energy having wavelengths in the radio frequency, microwave and/or optical regions (both visible and invisible).

When terms such as "including", "comprising" and variations of these are used in this specification or in claims, these terms are intended to be inclusive, in a manner similar to the way the term "provide" is used. Furthermore, the term "or" as used in this specification or in claims is intended to be not an exclusive disjunction.

Although the present disclosure has been described in detail above, it should be obvious to a person skilled in the art that the present disclosure is by no means limited to the embodiments described herein. The present disclosure can be implemented with various corrections and in various modifications, without departing from the spirit and scope of the present disclosure defined by the recitations of claims. Consequently, the description herein is provided only for the purpose of explaining examples, and should by no means be construed to limit the present disclosure in any way.

What is claimed is:

1. A downlink control information transmission method, comprising:
    generating more than one downlink control information (DCI) according to scheduling information of a user equipment (UE);
    determining a detection order of the more than one DCI and positions of the more than one DCI in a searching space;
    adding a position indication field to a respective DCI according to the detection order of the more than one DCI and the positions of the more than one DCI in the searching space; wherein, the position indication field is used to indicate a position of a next DCI of the respective DCI in the detection order; wherein, a position indication field in a last DCI in the detection order is used to indicate a position of a first DCI in the detection order; and
    transmitting the more than one DCI in the searching space according to the positions of the more than one DCI in the searching space.

2. The method according to claim 1, wherein the searching space is a shared searching space; the respective DCI in the more than one DCI respectively corresponds to a network slice; and the respective DCI comprises a slice indication field (SIF) to indicate the network slice corresponding to the respective DCI.

3. The method according to claim 2, wherein the respective DCI further comprises a number indication field to indicate the number of DCIs contained in the shared searching space.

4. The method according to claim 2, wherein the determining a detection order of the more than one DCI comprises:
    determining the detection order of the more than one DCI according to a pre-specified DCI order or determining the detection order of the more than one DCI by sorting the more than one DCI.

5. The method according to claim 1, wherein the searching space is a searching space for a respective network slice; and the respective DCI of the more than one DCI respectively corresponds to a network slice.

6. The method according to claim 5, wherein the method further comprises: determining a searching space from searching spaces of network slices as a priority searching space; wherein,
    in response to that a network slice corresponding to the priority searching space schedules data for the UE, then a DCI of the network slice corresponding to the priority searching space is a first DCI in the detection order;
    the determining positions of the more than one DCI in a searching space comprises: determining a position of the respective DCI in the searching space corresponding to the respective DCI, wherein, a searching space corresponding to the first DCI in the detection order is the priority searching space; searching spaces corresponding to DCIs other than the first DCI in the detection order are searching spaces of network slices corresponding to the DCIs; and
    the method further comprises: adding a slice indication field to the first DCI in the detection order to indicate the network slice corresponding to the first DCI.

7. The method according to claim 5, wherein, the method further comprises:

adding a bitmap field to a DCI of the more than one DCI to indicate a network slice that schedules data for the UE in a next transmission time interval.

8. The method according to claim 5, wherein the generating more than one DCI according to scheduling information of a UE comprises: generating one common DCI and more than one specific DCI according to the scheduling information of the UE;
the determining a detection order of the more than one DCI comprises: determining the detection order of the more than one DCI by sorting the more than one specific DCI or pre-specifying a specific DCI order;
the determining positions of the more than one DCI in a searching spaces comprises: determining a position of the common DCI in a common searching space and determining positions of the more than one specific DCI in searching spaces respectively correspond to the more than one specific DCI;
the adding a position indication field to a respective DCI comprises: adding a position indication field to a respective specific DCI to indicate a position of a next specific DCI; and
adding a position indication field to the common DCI to indicate a position of any specific DCI.

9. A downlink control information detecting method, comprising:
Step A, performing downlink control information (DCI) detection in a searching space, and proceeding to step B after detecting a DCI;
Step B, determining a position of a next DCI according to a position indication field in the currently detected DCI, wherein a respective DCI comprises a position indication field to indicate a position of a next DCI of the respective DCI; and
Step C, performing DCI detection at the position of the next DCI, and returning to Step B, until all DCIs are detected.

10. The method according to claim 9, wherein the method further comprises: in response to that no DCI is detected at the position of the next DCI, detecting the next DCI according to a predetermined DCI detection order.

11. The method according to claim 10, wherein the predetermined DCI detection order is configured by the base station.

12. The method according to claim 9, wherein the performing DCI detection in a searching space comprises: performing the DCI detection in a shared searching space; and
the method further comprises: determining a network slice corresponding to a currently detected DCI according to a slice indication field in the currently detected DCI.

13. The method according to claim 12, wherein the method further comprises: determining whether all DCIs have been detected according to a number indication field in the currently detected DCI, and in response to that the determination is yes, ending the method.

14. The method according to claim 9, wherein the performing DCI detection in a searching space comprises: performing the DCI detection in a searching space of a network slice; and
the method further comprises: determining a network slice corresponding to a currently detected DCI as a network slice corresponding to a searching space where the currently detected DCI is located.

15. The method according to claim 14, wherein the method further comprises: determining a network slice that schedules data for the UE in a next transmission time interval according to a bitmap field in the currently detected DCI.

16. The method according to claim 9, wherein the performing DCI detection in a searching space comprises: performing DCI detection in a priority searching space; and
the method further comprises: determining a network slice corresponding to a currently detected DCI according to a slice indication field in the currently detected DCI, in response to that a searching space where the currently detected DCI is located is the priority searching space; determining the network slice corresponding to the currently detected DCI to be a network slice corresponding to the searching space where the currently detected DCI is located, in response to that the searching space where the currently detected DCI is located is not the priority searching space.

17. The method according to claim 9, wherein the searching space is a common searching space; the performing DCI detection in a searching space in Step A comprises: performing detection for a common DCI in the common searching space;
wherein a position indication field in the common DCI is used to indicate a position of a specific DCI;
the determining a position of a next DCI according to a position indication field in the currently detected DCI in step B comprises:
in response to that the currently detected DCI is the common DCI, determining the position of the specific DCI according to the position indication field in the common DCI;
in response to that the currently detected DCI is a specific DCI, determining a position of a next specific DCI according to a position indication field in the specific DCI.

18. A base station, comprising:
a processor;
a memory in connection with the processor; wherein the memory stores machine-readable instruction modules executable by the processor; the machine-readable instruction modules comprise:
a generation module to generate more than one downlink control information (DCI) according to scheduling information of a user equipment (UE);
a detection order determination module to determine a detection order of the more than one DCI;
a position determination module to determine positions of the more than one DCI in a searching space;
a position field adding module to add a position indication field to a respective DCI according to the detection order of the more than one DCI and the positions of the more than one DCI in the searching spaces; wherein, the position indication field is used to indicate a position of a next DCI of the respective DCI in the detection order; wherein, a position indication field in a last DCI in the detection order is used to indicate a position of a first DCI in the detection order; and
a transmission module to transmit the more than one DCI in the searching space according to the positions of the more than one DCI in the searching space.

* * * * *